(12) United States Patent  (10) Patent No.: US 8,774,084 B2
Palanki et al.  (45) Date of Patent: Jul. 8, 2014

(54) BASE STATION SYNCHRONIZATION

(75) Inventors: Ravi Palanki, San Diego, CA (US); Lei Xiao, Mountain View, CA (US); Parag A. Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 12/538,457

(22) Filed: Aug. 10, 2009

(65) Prior Publication Data

US 2010/0046494 A1 Feb. 25, 2010

Related U.S. Application Data

(60) Provisional application No. 61/091,089, filed on Aug. 22, 2008.

(51) Int. Cl.
*H04B 7/212* (2006.01)
(52) U.S. Cl.
USPC ........... 370/324; 370/350; 370/507; 370/509; 370/512; 370/516
(58) Field of Classification Search
USPC ......... 370/321, 337, 347, 458, 503, 509, 510, 370/511, 512, 513, 514, 515
See application file for complete search history.

(56) References Cited

U.S. PATENT DOCUMENTS

| | | | | |
|---|---|---|---|---|
| 5,390,366 A | * | 2/1995 | Kasugai | 455/524 |
| 5,712,867 A | * | 1/1998 | Yokev et al. | 375/136 |
| 6,256,507 B1 | * | 7/2001 | Lemieux | 455/502 |
| 6,542,754 B1 | * | 4/2003 | Sayers et al. | 455/502 |
| 6,622,022 B1 | | 9/2003 | Du | |
| 6,665,316 B1 | | 12/2003 | Eidson | |
| 7,194,010 B2 | | 3/2007 | Beasley et al. | |
| 2002/0018475 A1 | * | 2/2002 | Ofek et al. | 370/400 |
| 2003/0012158 A1 | * | 1/2003 | Jin et al. | 370/335 |
| 2004/0013127 A1 | * | 1/2004 | Shvodian | 370/442 |

(Continued)

FOREIGN PATENT DOCUMENTS

| | | |
|---|---|---|
| CN | 101039145 A | 9/2007 |
| DE | 10106807 | 9/2002 |

(Continued)

OTHER PUBLICATIONS

International Search Report & Written Opinion—PCT/US2009/054688, International Search Authority—European Patent Office—Apr. 19, 2010.

(Continued)

*Primary Examiner* — Alvin Zhu
(74) *Attorney, Agent, or Firm* — François A. Pelaez

(57) ABSTRACT

Systems and methodologies are described that facilitate synchronizing base stations in a wireless communication environment. A base station can receive a synchronization signal sent via a low reuse channel, which can be shared by a group of base stations. Further, the base station can align a clock associated therewith to the received synchronization signal. Moreover, the base station can coarsely align the clock to a first synchronization signal received upon a first subset of resources of the low reuse channel, and finely align the clock to a second synchronization signal received upon a second subset of resources (e.g., of the low reuse channel, of a separate channel, . . . ), where the second subset of resources can be reserved for transmission from at least one base station with at least a predetermined level of synchronous accuracy.

47 Claims, 16 Drawing Sheets

(56) References Cited

U.S. PATENT DOCUMENTS

| | | | |
|---|---|---|---|
| 2004/0014477 A1* | 1/2004 | Ishiguro et al. | 455/450 |
| 2004/0097249 A1* | 5/2004 | Manohar | 455/502 |
| 2005/0068931 A1* | 3/2005 | Cho et al. | 370/345 |
| 2006/0056432 A1 | 3/2006 | Azarov | |
| 2009/0225743 A1* | 9/2009 | Nicholls et al. | 370/350 |

FOREIGN PATENT DOCUMENTS

| | | |
|---|---|---|
| GB | 2270237 | 3/1994 |
| JP | 2002176376 A | 6/2002 |
| JP | 2008002888 A | 1/2008 |
| JP | 2008113359 A | 5/2008 |
| WO | WO0069102 A1 | 11/2000 |
| WO | WO0108344 A2 | 2/2001 |
| WO | 2008097150 A1 | 8/2008 |

OTHER PUBLICATIONS

Taiwan Search Report—TW098128424—TIPO—Sep. 5, 2012.

* cited by examiner

BASE STATION SYNCHRONIZATION

CLAIM OF PRIORITY UNDER 35 U.S.C. §119

The present Application for Patent claims priority to Provisional Application No. 61/091,089 entitled "METHODS AND APPARATUS FOR BASE STATION SYNCHRONIZATION" filed Aug. 22, 2008, and assigned to the assignee hereof and hereby expressly incorporated by reference herein.

BACKGROUND

1. Field

The following description relates generally to wireless communications, and more particularly to providing synchronization between base stations via signals sent over a low reuse channel in a wireless communication environment.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to mobile devices using a wireless technology (e.g., 3GPP Universal Mobile Telecommunications System (UMTS) or Long Term Evolution (LTE), 1xEvolution-Data Optimized (1xEV-DO), . . . ) to communicate with the mobile devices and an existing broadband Internet connection (e.g., digital subscriber line (DSL), cable, . . . ) for backhaul. A femto cell base station can also be referred to as a Home Node B (HNB), a femto cell, or the like. Examples of other types of base stations include pico cell base stations, micro cell base stations, and so forth.

Base stations in a wireless communication environment oftentimes attempt to operate in a synchronized manner. Synchronization among base stations in a wireless network can be beneficial for mitigating interference between base stations. For instance, if respective clocks of base stations are not aligned in time or frequency, the base stations can interfere with each other, thereby detrimentally impacting performance. Additionally, synchronization between base stations can enable employing virtual multiple-input multiple-output (MIMO) or sensor data fusion.

Traditionally, synchronization between base stations in a wireless cellular network can be achieved by collocating a respective Global Positioning System (GPS) receiver at each base station. A GPS receiver can provide a timing source for a base station. Accordingly, a clock of a base station can be aligned utilizing information obtained via a GPS receiver. Thus, synchronization between the base stations can be achieved since each base station can align its corresponding clock by employing information received by a respective GPS receiver.

GPS receivers and/or GPS signals, however, can be unavailable for synchronization purposes under various scenarios. For example, lack of availability of GPS receivers and/or GPS signals can be due to manufacturing cost considerations, power consumption limitations, and/or lack of line-of-sight to GPS satellites; however, it is to be appreciated that GPS receivers and/or GPS signals can be unavailable due to any other reason(s). For instance, less powerful base stations (e.g. femto cell base stations, pico cell base stations, . . . ) can be included in a heterogeneous wireless communication system along with macro cell base stations. The less powerful base stations can be leveraged to enhance network throughput; yet, these less powerful base stations oftentimes can be placed indoors (e.g., fail to receive GPS signals from GPS satellites, . . . ) and/or lack GPS receivers associated therewith.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with synchronizing base stations in a wireless communication environment. A base station can receive a synchronization signal sent via a low reuse channel, which can be shared by a group of base stations. Further, the base station can align a clock associated therewith to the received synchronization signal. Moreover, the base station can coarsely align the clock to a first synchronization signal received upon a first subset of resources of the low reuse channel, and finely align the clock to a second synchronization signal received upon a second subset of resources (e.g., of the low reuse channel, of a separate channel, . . . ), where the second subset of resources can be reserved for transmission from at least one base station with at least a predetermined level of synchronous accuracy.

According to related aspects, a method is described herein. The method can include receiving a signal at a base station via a low reuse channel. Moreover, the method can include aligning a clock of the base station to the signal.

Another aspect relates to a wireless communications apparatus. The wireless communications apparatus can include at least one processor. The at least one processor can be configured to receive a synchronization signal at a base station via a low reuse channel. Further, the at least one processor can be configured to tune a clock of the base station to the synchronization signal.

Yet another aspect relates to a wireless communications apparatus. The wireless communications apparatus can include means for obtaining a set of synchronization signals at a base station via a low reuse channel. The wireless communications apparatus can further include means for aligning a clock of the base station to at least one synchronization signal from the set.

Still another aspect relates to a computer program product that can comprise a computer-readable medium. The computer-readable medium can include code for causing at least one computer to receive a signal at a base station via a low reuse channel. Moreover, the computer-readable medium can include code for causing at least one computer to align a clock of the base station to the signal.

Yet another aspect relates to an apparatus that can include a reception component that obtains a synchronization signal at a receiving base station via a low reuse channel. Further, the apparatus can include an adjustment component that aligns a clock of the receiving base station to the obtained synchronization signal.

According to other aspects, a method is described herein. The method can include generating a synchronization signal based on a clock of a base station. Further, the method can include transmitting the synchronization signal from the base station over a low reuse channel shared by a group of base stations.

Another aspect relates to a wireless communications apparatus. The wireless communications apparatus can include at least one processor. The at least one processor can be configured to yield a synchronization signal based on a clock of a base station. The at least one processor can further be configured to send the synchronization signal from the base station over a low reuse channel shared by a group of base stations.

Yet another aspect relates to a wireless communications apparatus. The wireless communications apparatus can include means for generating a synchronization signal as a function of a clock of a base station. Moreover, the wireless communications apparatus can include means for sending the synchronization signal from the base station over a low reuse channel.

Still another aspect relates to a computer program product that can comprise a computer-readable medium. The computer-readable medium can include code for causing at least one computer to yield a synchronization signal as a function of a clock of a base station. Moreover, the computer-readable medium can include code for causing at least one computer to transmit the synchronization signal from the base station over a low reuse channel shared by a plurality of base stations.

Yet another aspect relates to an apparatus that can include a synchronization signal generation component that yields a synchronization signal based upon a clock of a transmitting base station. Moreover, the apparatus can include a transmission component that sends the synchronization signal from the transmitting base station over a low reuse channel shared by a group of base stations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
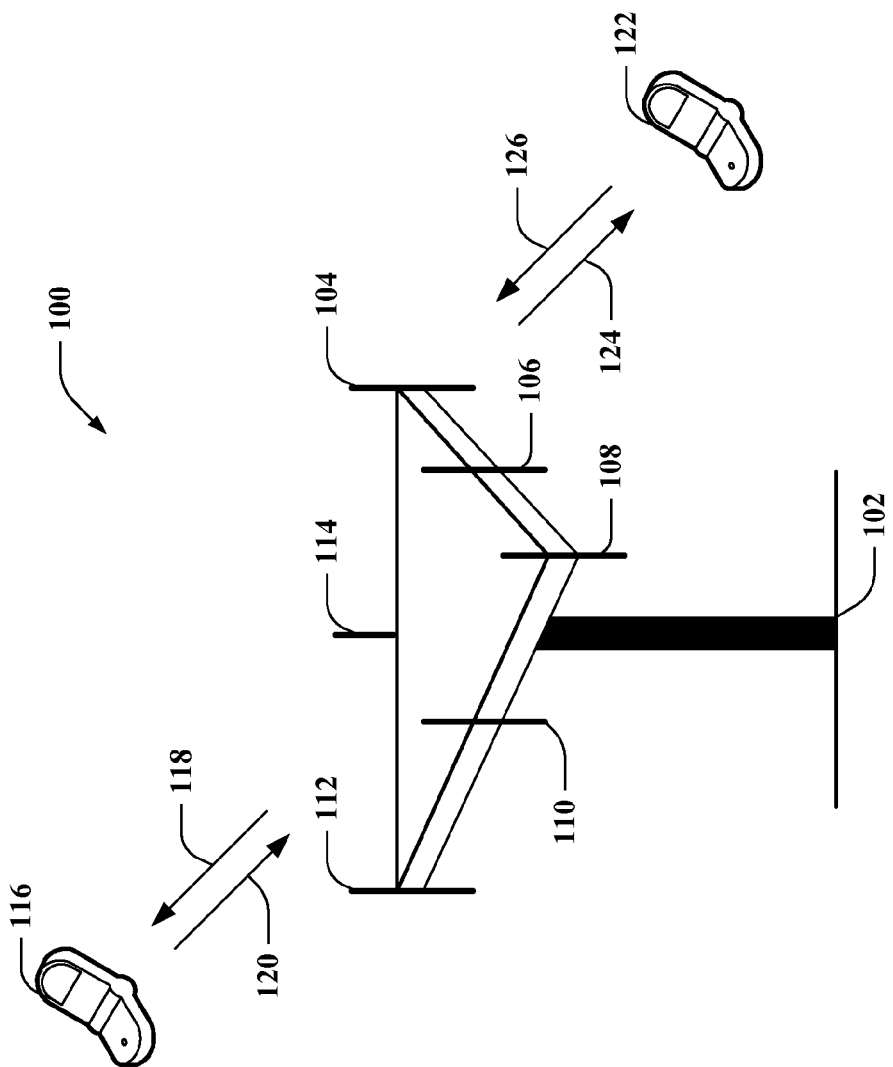
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, an Evolved Node B (eNode B, eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system can implement a radio technology such as Global System for Mobile Communications (GSM).

An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and Ultra Mobile Broadband (UMB) are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

System 100 can support synchronizing base stations (e.g., base station 102, disparate base stations (not shown), ...) utilizing a low reuse channel for such purpose. According to an illustration, the low reuse channel can be a dedicated shared channel. The low reuse channel can enable reducing interference and can provide synchronization among the base stations. Synchronization between base stations, for example, can yield throughput gain and/or support interference management. According to further examples, such synchronization among base stations can be leveraged to employ virtual multiple-input multiple output (MIMO) and/or provide sensor data fusion.

By way of illustration, system 100 can be a heterogeneous wireless communication system. Hence, system 100 can include macro cell base stations, femto cell base stations, pico cell base stations, and/or the like. Lower power base stations such as femto cell base stations and pico cell base stations can lack respective Global Positioning System (GPS) receivers associated therewith and/or can be unable to receive GPS signals (e.g., due to being positioned indoors, ...). Assuming base station 102 is a lower power base station that lacks a GPS receiver (e.g., included in base station 102, collocated with base station 102, ...) and/or is unable to receive a GPS signal, then base station 102 can be unable to synchronize its time and/or frequency directly based upon information obtained with a corresponding GPS receiver. Moreover, it is to be appreciated that a higher power base station (e.g., macro cell base station, ...) can similarly be unable to receive a GPS signal and/or can lack an associated GPS receiver. According to another illustration, system 100 can be a system that includes base stations that traditionally are not synchronous such as, for instance, a Universal Mobile Telecommunications System (UMTS) network.

System 100 can enable synchronizing base stations when at least a subset of base stations (e.g., in an unplanned heterogeneous network deployment, ...) fail to be associated with respective GPS receivers and/or are unable to receive GPS signals. Additionally or alternatively, system 100 can support synchronizing base stations in a network designed to be asynchronous; hence, benefits that result from synchronization can be yielded by employing techniques described herein without needing to add a GPS receiver to each base station in such a network.

Figure 2:
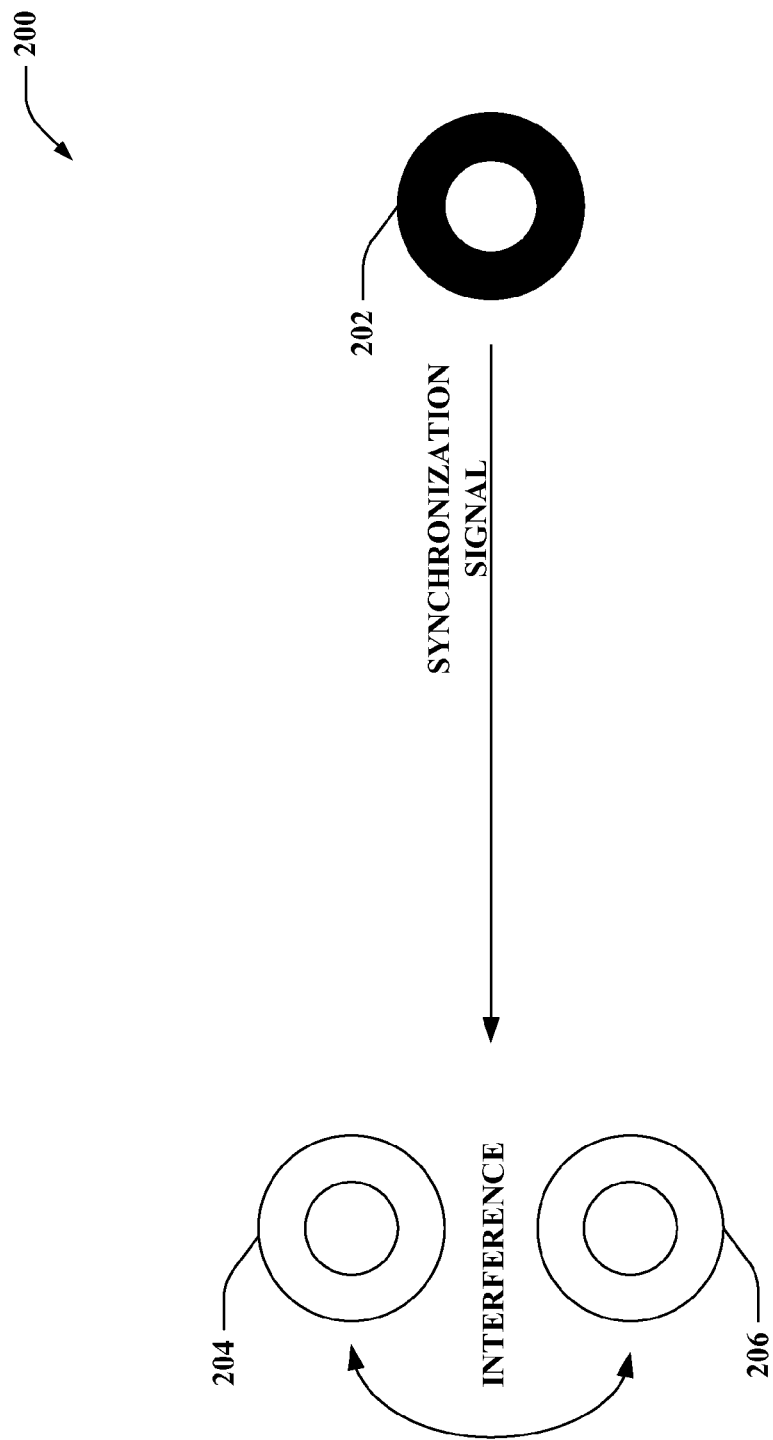
FIG. 2 is an illustration of an example system that includes base stations that interfere with each other when attempting synchronization in a wireless communication environment.

Turning to FIG. 2, illustrated is a system 200 that includes base stations that interfere with each other when attempting synchronization in a wireless communication environment. System 200 includes a base station 202 that can transmit a synchronization signal. Base station 202 can be a synchronous base station. Further, system 200 can include disparate base stations (e.g., base station 204 and base station 206, ...), which can attempt to listen to the synchronization signal from base station 202 over the air. Based upon the received synchronization signal, base stations 204-206 can each accordingly tune their clocks.

A conventional synchronization technique leverages having base stations listen to each other for synchronization. Thus, base stations 204-206 (e.g., non-GPS base stations, asynchronous base stations, ...) can listen to the over the air synchronization signal from base station 202 for synchronization purposes. However, in traditional approaches, these techniques typically apply to timing correction in broadcasting service in a cellular infrastructure.

Signal interference can be a major limiting factor in an unplanned deployment. Detrimental interference can hinder an ability of a non-GPS base station (e.g., base station 204, base station 206, ...) from listening to a desired synchronization signal (e.g., from base station 202, ...) over the air. This is particularly true in heterogeneous deployments; for instance, in a heterogeneous deployment, base stations 204-206 can each be a lower power base station (e.g., pico cell base station, femto cell base station, ...) that lacks good geometry. When employing conventional techniques, base stations 204-206 can cause severe jamming among themselves. Following the depicted example, base stations 204-206 can be nearby each other and can both be asynchronous. Moreover, base stations 204-206 can produce interference between each other at a high level such that neither base station 204-206 can be able to enjoy a good signal to interference ratio (SIR) on the synchronization signal from synchronous base station 202.

Figure 3:
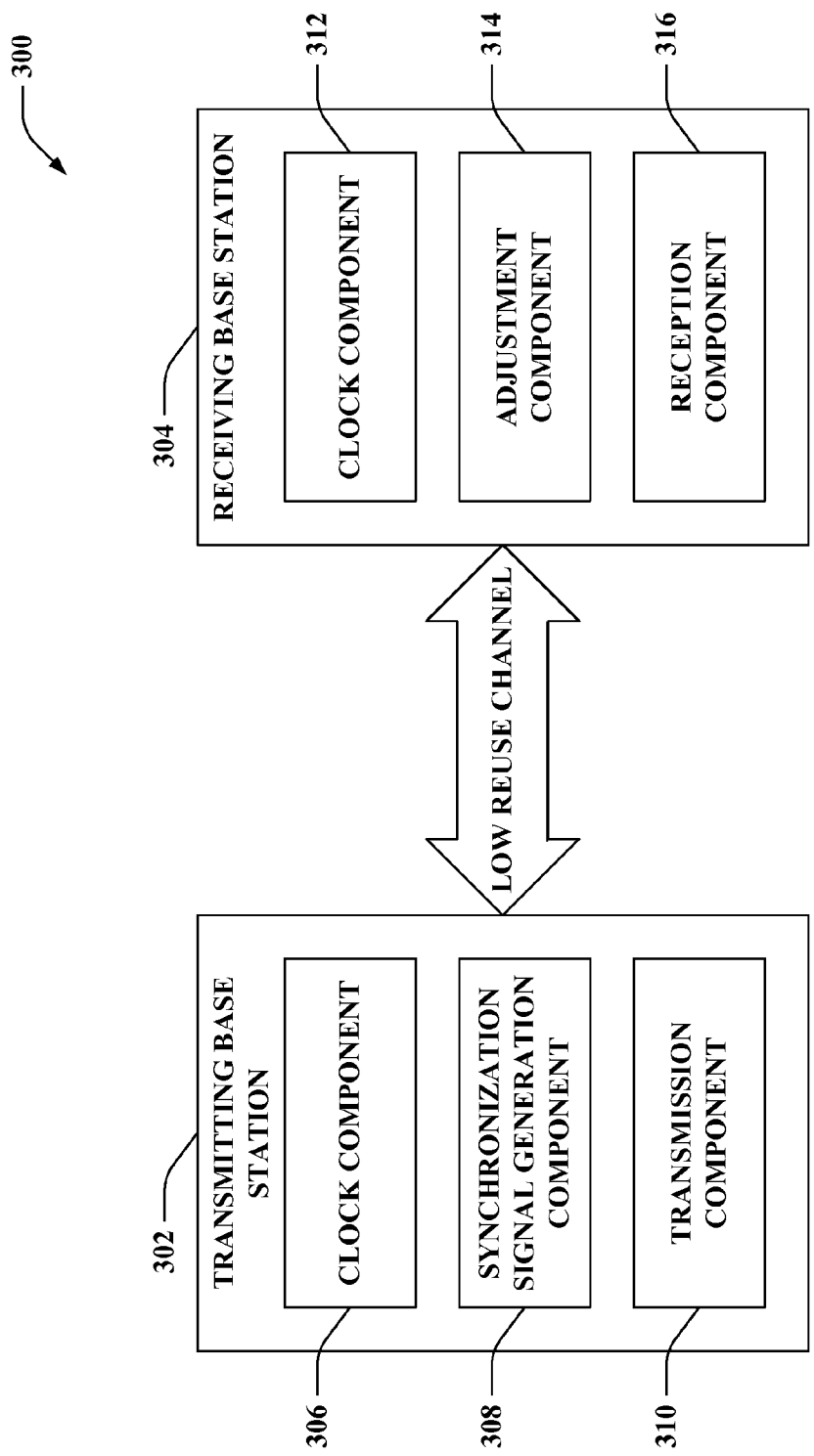
FIG. 3 is an illustration of an example system that employs a low reuse channel to synchronize base stations in a wireless communication environment.

Referring to FIG. 3, illustrated is a system 300 that employs a low reuse channel to synchronize base stations in a wireless communication environment. System 300 includes a transmitting base station 302 and a receiving base station 304. Transmitting base station 302 and receiving base station 304 can each transmit and/or receive information, signals, data, instructions, commands, bits, symbols, and the like. Moreover, transmitting base station 302 and receiving base station 304 can communicate via a low reuse channel. It is contemplated that transmitting base station 302 and/or receiving base station 304 can each be any type of base station (e.g. femto cell base station, pico cell base station, micro cell base station, macro cell base station, ...). Although not shown, it is to be appreciated that system 300 can also include any number of disparate base station(s), each of which can communicate over the low reuse channel. Further, it is contemplated that transmitting base station 302 can be a receiving base station and/or receiving base station 304 can be a transmitting base station 302; thus, receiving base station 304 can send a transmission over the low reuse channel and/or transmitting base station 302 can receive a transmission sent over the low reuse channel. Moreover, although not depicted, it is contemplated that system 300 can further include substantially any number of mobile devices, which can each communicate with one or more of transmitting base station 302 and receiving base station 304 via the forward link and/or reverse link.

Transmitting base station 302 can further include a clock component 306, a synchronization component 308, and a transmission component 310. Clock component 306 can control a clock associated with transmitting base station 302. By way of a further example, it is contemplated that clock component 306 can manage a plurality of internal clocks associated with transmitting base station 302. Clock component 306 can be set based upon information obtained from various sources. For example, although not shown, it is contemplated that transmitting base station 302 can be associated with a GPS receiver (e.g., located nearby transmitting base station 302, coupled to transmitting base station 302, included in transmitting base station 302, . . . ). Following this example, clock component 306 of transmitting base station 302 can be controlled based upon information received by the GPS receiver. According to another illustration, clock component 306 of transmitting base station 302 can be controlled as a function of information received from one or more disparate base stations (e.g. receiving base station 304, differing base station(s) (not shown), . . . ); hence, clock component 306 can derive timing based upon information from disparate base station(s). It is to be appreciated, however, that the claimed subject matter is not limited to the foregoing, as it is contemplated that clock component 306 of transmitting base station 302 can be managed based upon information from substantially any source.

Moreover, synchronization signal generation component 308 can yield a synchronization signal based upon clock component 306 of transmitting base station 302. For instance, the synchronization signal can include information related to timing of clock component 306. Moreover, the synchronization signal generated by synchronization signal generation component 308 can include frequency related information maintained by transmitting base station 302 (e.g., managed by clock component 306, . . . ).

Transmission component 310 can transmit the synchronization signal yielded by synchronization signal generation component 308 from transmitting base station 302 over the low reuse channel, which can be shared by a group of base stations (e.g., including receiving base station 304, . . . ). For instance, the transmitted synchronization signal can be used to tune respective timing and/or frequency of one or more base stations in the group (e.g., receiving base station 304, . . . ) as described herein.

Receiving base station 304 can include a clock component 312, an adjustment component 314, and a reception component 316. Clock component 312 can control a clock (or plurality of clocks) associated with receiving base station 304. Further, clock component 312 of receiving base station 304 can be similar to clock component 306 of transmitting base station 302. Moreover, adjustment component 314 can align clock component 312 to a synchronization signal received by reception component 316. Adjustment component 314 can employ the received synchronization signal for time synchronization and/or frequency synchronization.

Reception component 316 can obtain a synchronization signal at receiving base station 304. Reception component 316 can detect a synchronization signal sent over the low reuse channel. The synchronization signal can be received via the low reuse channel from a disparate base station in a group of base stations that shares the low reuse channel. Thus, for instance, reception component 316 can obtain the synchronization signal sent by transmitting base station 302 over the low reuse channel; however, the claimed subject matter is not so limited as it is to be appreciated that the synchronization signal obtained by reception component 316 and utilized by adjustment component 314 can be sent from substantially any disparate transmitting base station (not shown).

The low reuse channel can be a dedicated shared channel deployed for the purpose of synchronization (e.g., time synchronization and/or frequency synchronization, . . . ) among base stations (e.g., transmitting base station 302, receiving base station 304, any disparate base station(s) (not shown), . . . ). The low reuse channel can be available to all base stations, but each base station can transmit with low probability. Further, an asynchronous base station (e.g., receiving base station 304, lower power base station such as a femto cell base station or a pico cell base station, . . . ) can monitor the low reuse channel and search for synchronization signals that are not severely corrupted. Thus, for example, reception component 316 and/or adjustment component 314 can examine the low reuse channel for synchronization signals below a threshold level of corruption.

Various resources can be utilized for the low reuse channel. For example, the low reuse channel can include a set of subcarriers in an orthogonal frequency division multiple access (OFDMA) system. By way of another example, the low reuse channel can comprise a frequency band in a frequency division multiple access (FDMA) system. It is to be appreciated, however, that the claimed subject matter is not limited to the aforementioned examples.

Moreover, a plurality of transmitting base stations (e.g. transmitting base station 302, disparate transmitting base station(s), . . . ) can send synchronization signals over the low reuse channel (e.g., each utilizing a respective transmission component similar to transmission component 310 of transmitting base station 302, . . . ). Yet, each base station can transmit in a particular transmission slot from a set of N transmission slots associated with the low reuse synchronization channel, where N can be an integer. For instance, transmitting base station 302 (e.g., transmission component 310, . . . ) can employ a first transmission slot from the set, while a disparate transmitting base station (not shown) can utilize a second transmission slot from the set; however, the claimed subject matter is not so limited. Since each base station utilizes a respective one out of the N transmission slots in the set, the number of simultaneous transmissions and the amount of interference in each slot can be reduced.

According to a further example, a respective transmission slot from the set of N transmission slots utilized by each transmitting base station to transmit respective synchronization signals can vary over time. For instance, the time variation can be a function of a pseudorandom sequence that is known to other base stations a priori. Thus, transmission component 310 can change the particular transmission slot from the set of N transmission slots employed by transmitting base station 302 for sending a synchronization signal yielded by synchronization signal generation component 308 over the low reuse channel as a function of time (e.g., based upon a respective predetermined pseudorandom sequence corresponding to transmitting base station 302 that is known by receiving base station 304 and/or disparate base station(s) receiving and/or transmitting synchronization signals via the low reuse channel, . . . ).

By varying transmission slots based upon time, receiving base stations (e.g., receiving base station 304, asynchronous base station(s), lower power base station(s), . . . ) can observe different interference patterns over time. Further, each receiving base station can use a least interfered synchronization signal available. By way of illustration, reception component 316 can recognize a least interfered synchronization signal received via the low reuse channel. Following this illustration, adjustment component 314 can utilize the synchronization signal with the lowest interference to synchronize clock component 312.

By leveraging the low reuse channel, lower power base stations (e.g., receiving base station 304, femto cell base station(s), pico cell base station(s), . . . ) with poor geometry can obtain a clean synchronization signal from neighbor base stations (e.g., transmitting base station 302, disparate transmitting base station(s), . . . ) over the air. Further, the lower power base stations can each respectively synchronize itself (e.g., in time and/or frequency, . . . ) to other base stations in a network. Thus, the low reuse channel, when utilized for synchronizing base stations, can alleviate lower power base stations from experiencing heavy interference at levels that detrimentally impact synchronization thereof due to poor geometry.

The low reuse channel can carry synchronization signals from various transmitting base stations (e.g., transmitting base station 302, . . . ). Synchronization signals can be transmitted with a reuse factor greater than one so that only a fraction of base stations transmit their synchronization signals on a given time and/or frequency resource. For example, with a reuse factor of M, where M>1, only one out of every M base stations can transmit its synchronization signal on a given resource. A higher reuse factor (e.g., larger value of M, . . . ) corresponds to lower reuse, and vice versa. The synchronization signal sent over the low reuse channel from a given transmitting base station can thus observe less interference from synchronization signals from other transmitting base stations, which can enable detection of synchronization signals by more receiving base stations.

An example of a synchronization signal that can be transmitted over the low reuse channel is a positioning reference signal (PRS). Transmission component 310 of transmitting base station 302 can transmit a PRS in a subframe (or slot) designated for PRS transmission. A subframe can include two slots, and each slot can include seven symbol periods, for instance. According to an example, transmitting base station 302 can transmit the PRS in symbol periods not used for a reference signal for control information. A symbol period with a PRS transmission can be referred to as a PRS symbol period. In each PRS symbol period, transmitting base station 302 can transmit the PRS on every sixth subcarrier starting with a particular subcarrier. Different starting subcarriers can be used in different PRS symbol periods, for instance, to allow the PRS to be transmitted on all or most of the K total subcarriers. This can allow receiving base stations (e.g., receiving base station 304, . . . ) to obtain a more accurate time measurement for transmitting base station 302 based on the PRS. In accordance with the above example where the PRS is transmitted on every sixth subcarrier in each PRS symbol period, a reuse factor of six can be achieved. It is to be appreciated, however, that the claimed subject matter is not limited to the aforementioned example.

Figure 4:
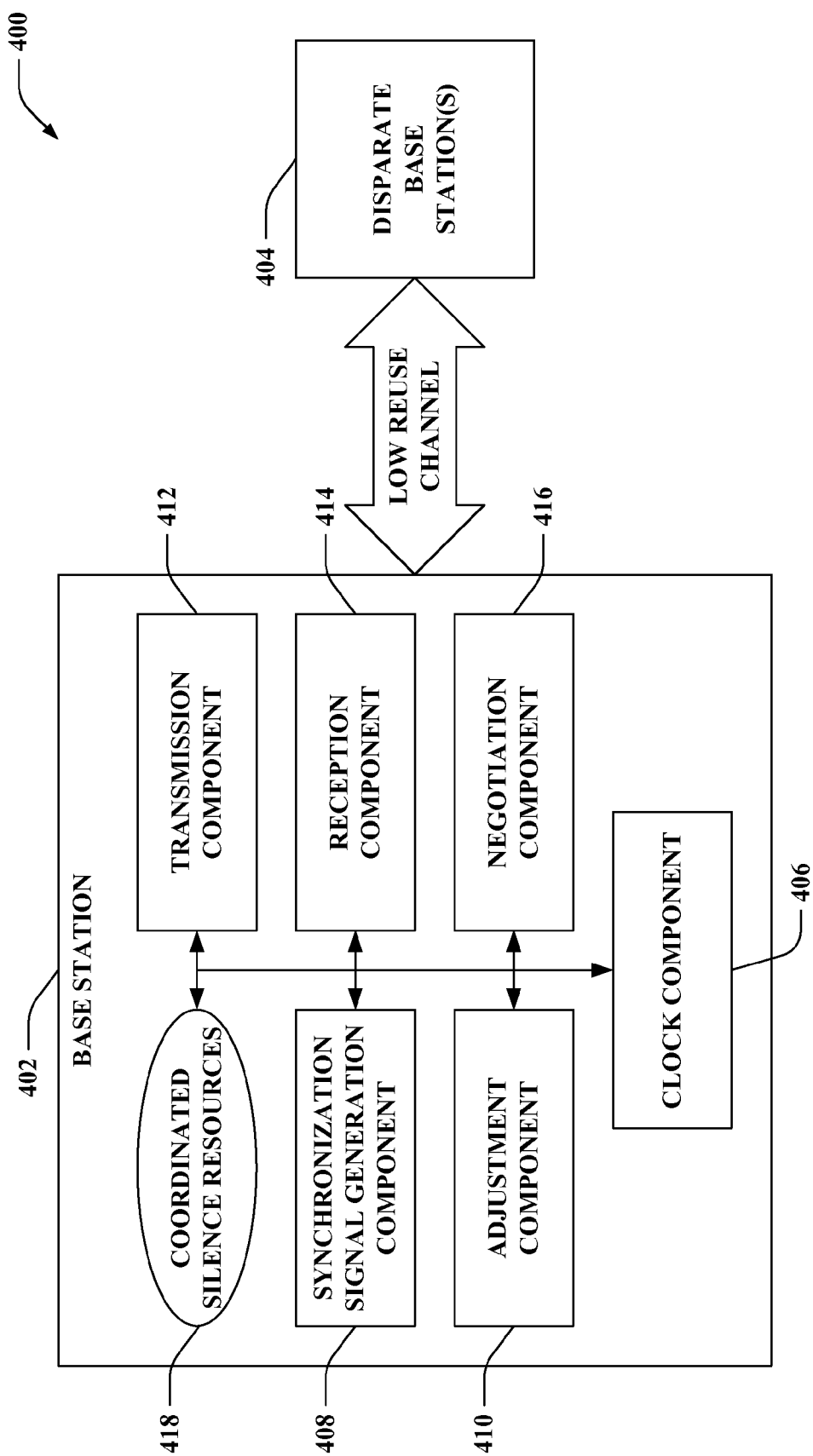
FIG. 4 is an illustration of an example system that employs multistage alignment of base station timing in a wireless communication environment.

Turning to FIG. 4, illustrated is a system 400 that employs multistage alignment of base station timing in a wireless communication environment. System 400 includes a base station 402 and any number of disparate base station(s) 404 that share a low reuse channel for transferring synchronization signals. Base station 402, for example, can be substantially similar to transmitting base station 302 of FIG. 3 and/or receiving base station 304 of FIG. 3. Further, each of disparate base station(s) 404 can be substantially similar to transmitting base station 302 of FIG. 3 and/or receiving base station 304 of FIG. 3.

Base station 402 can include a clock component 406 (e.g. clock component 306 of FIG. 3, clock component 312 of FIG. 3, . . . ), a synchronization signal generation component 408 (e.g. synchronization signal generation component 308 of FIG. 3, . . . ), an adjustment component 410 (e.g. adjustment component 314 of FIG. 3, . . . ), a transmission component 412 (e.g., transmission component 310 of FIG. 3, . . . ), and a reception component 414 (e.g. reception component 316 of FIG. 3, . . . ). Base station 402 (e.g. adjustment component 410, . . . ) can tune clock component 406 based upon synchronization signal(s) received by reception component 414 from one or more of disparate base station(s) 404 via the low reuse channel. Additionally or alternatively, base station 402 can yield a synchronization signal (e.g., with synchronization signal generation component 408, . . . ) based upon clock component 406, and the yielded synchronization signal can be sent over the low reuse channel by transmission component 412.

According to an example, base station 402 can transmit a synchronization signal yielded based upon clock component 406 over the low reuse channel during a portion of a time period, and can listen to the low reuse channel (e.g., for synchronization signal(s) sent by disparate base station(s) 404, . . . ) when not transmitting on the low reuse channel. Further, adjustment component 410 can, but need not, align clock component 406 as a function of synchronization signal(s) obtained by reception component 414 via the low reuse channel.

Due to the low reuse nature, it can be spectrum inefficient to allocate large bandwidth for the low reuse channel employed for conveying synchronization signals. Further, a narrow band channel can suffer time ambiguity. According to an example, if the low reuse channel does not provide sufficient timing accuracy, a two stage synchronization strategy can be used by system 400. When aligning clock component 406 as part of the two stage synchronization strategy, adjustment component 410 of base station 402 can coarsely tune clock component 406 (e.g., based upon a first received synchronization signal, . . . ) and then finely tune clock component 406 (e.g., based upon a second received synchronization signal obtained via the low reuse channel or a separate channel, . . . ). Additionally or alternatively, when transmitting a synchronization signal over the low reuse channel, depending upon a level of synchronous accuracy of clock component 406, base station 402 can transmit the synchronization signal yielded by synchronization signal generation component 408 using resources of the low reuse channel associated with both coarse timing and fine timing (e.g., if clock component 406 has a level of synchronous accuracy above a threshold, . . . ), or utilizing resources of the low reuse channel associated with coarse timing while inhibiting transmission utilizing resources associated with fine timing (e.g., if clock component 406 has a level of synchronous accuracy below the threshold, . . . ).

Following the aforementioned example, the low reuse channel can first provide coarse timing to base stations sharing the low reuse channel (e.g., base station 402, disparate base station(s) 404, . . . ). Further, a coordinated silence for delivering fine timing can then be negotiated among base station 402 and disparate base station(s) 404. Base station 402 can include a negotiation component 416 that can cooperate with disparate base station(s) 404 (e.g., respective disparate negotiation component(s) of disparate base station(s) which can each be substantially similar to negotiation component 416, ...) to identify coordinated silence resources 418 to be utilized for communicating fine timing. Coarse timing can refer to timing that does not satisfy a required synchronous accuracy (e.g., timing with a level of synchronous accuracy below the threshold, ...), while fine timing can refer to timing that satisfies such requirement (e.g., timing with a level of synchronous accuracy above the threshold, ...). The coordinated silence resources 418 identified by negotiation component 416 and agreed upon among base station 402 and disparate base station(s) 404 can include a time, period, frequency band, and/or spreading code to be employed for transmitting a synchronization signal. The period of the coordinated silence, for instance, can depend on an accuracy of the coarse timing. Further, during the coordinated silence, base stations with fine timing can be allowed to transmit synchronization signals over the low reuse channel or a separate channel using the coordinated silence resources 418 and base stations without fine timing can inhibit transmission of synchronization signals over the low reuse channel or the separate channel employing the coordinated silence resources 418. Moreover, base stations without fine timing can search for a fine timing synchronization signal (e.g., with reception component 414, ...) sent upon the coordinated silence resources 418 of the low reuse channel or the separate channel.

By way of illustration, negotiation component 416 can interact with disparate base station(s) 404 to recognize the coordinated silence resources 418 as a function of clock drift. For instance, clock component 406 can be associated with a clock drift such that it is estimated to fall below a synchronous accuracy level after a period of time (e.g., T seconds, where T can be substantially any value, ...). Hence, negotiation component 416 can cause a coordinated silence to be scheduled based upon the clock drift. Thus, transmission component 412 can halt transmission of a synchronization signal from base station 402 after T seconds from a previous alignment of clock component 406 effectuated by adjustment component 410 for a period of time associated with the coordinated silence. Moreover, during the period of time associated with the coordinated silence, reception component 414 can listen to synchronization signal(s) transmitted using the coordinated silence resources 418 (e.g., upon the low reuse channel or a separate channel, ...) from one or more disparate base station(s) 404. Further, clock component 406 can be realigned by adjustment component 410 using a synchronization signal received via reception component 414. Thus, synchronization can be maintained among base station 402 and disparate base station(s) 404.

Employment of the coordinated silence negotiated among base station 402 and disparate base station(s) 404 can yield enhanced signal reception capability. According to a further example, it is contemplated that coordinated silence need not only apply to fine synchronization. Rather, coordinated silence can also be used to reduce interference and increase signal detection range in a network when coarse synchronization is available. However, it is to be appreciated that the claimed subject matter is not limited to the foregoing example.

Again referring to the example depicted in FIG. 2, coordinated silence negotiated between base stations can mitigate interference between base stations. For example, base stations 204-206 can coarsely tune corresponding clocks there between. For instance, base stations 204-206 can initially be asynchronous; however, the claimed subject matter is not so limited. Following this example, base station 204 can transmit a synchronization signal over a low reuse channel, and base station 206 can receive the synchronization signal sent by base station 204 and coarsely align its clock based upon the received synchronization signal. Moreover, base stations 204-206 (and/or base station 202) can negotiate a coordinated silence; hence, coordinated silence resources can be identified via such negotiation. During the coordinated silence, base stations 204-206 can both stop synchronization temporarily and search for a synchronization signal from a disparate base station such as base station 202. Since the previously interfering pair of base stations 204-206 no longer interferes with each other during coordinated silence, each base station 204-206 can observe the synchronization signal from base station 202 with better signal to interference ratio.

Figure 5:
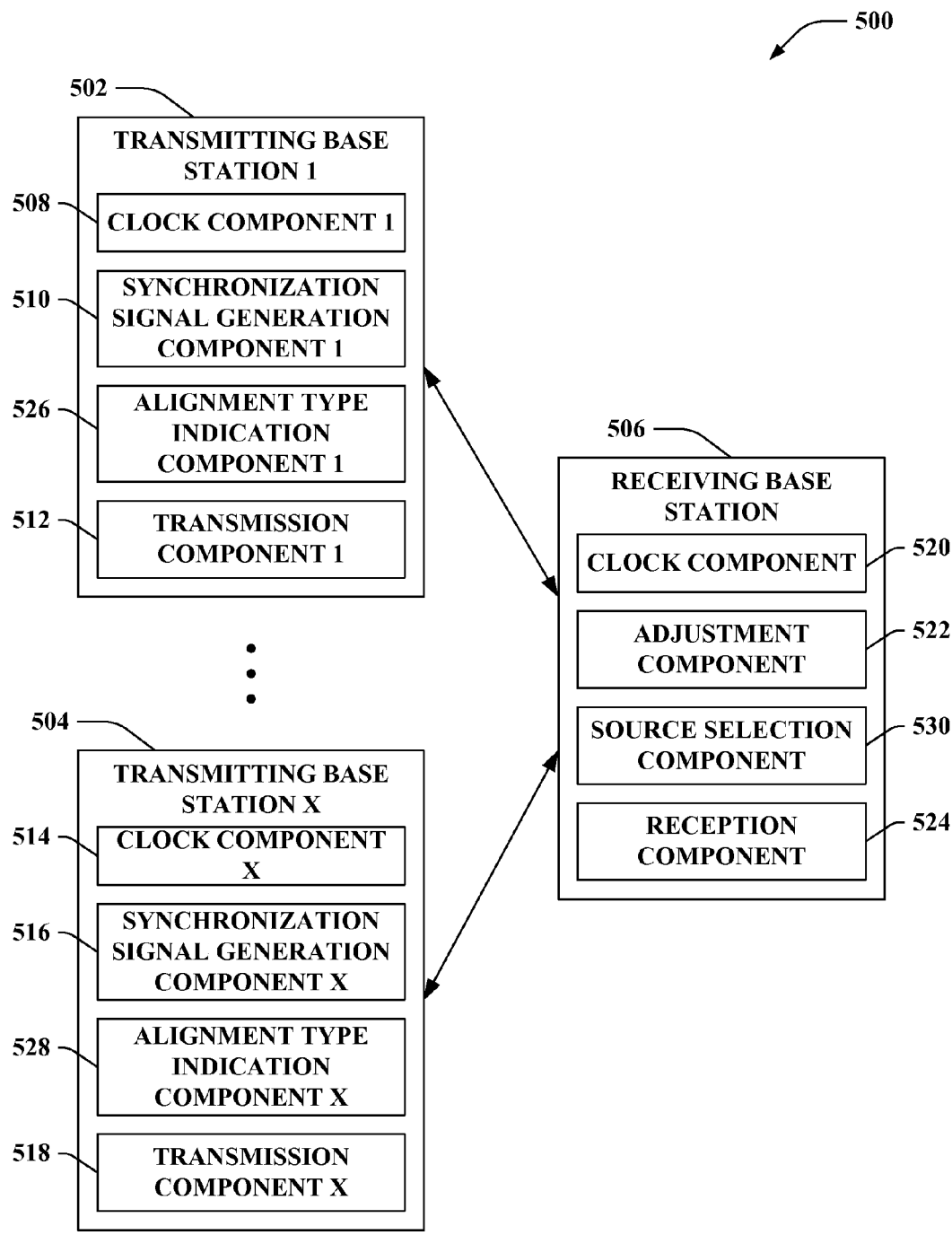
FIG. 5 is an illustration of an example system that enables selecting a synchronization signal from a plurality of synchronization signals received via a low reuse channel in a wireless communication environment.

Turning to FIG. 5, illustrated is a system 500 that enables selecting a synchronization signal from a plurality of synchronization signals received via a low reuse channel in a wireless communication environment. System 500 can include X transmitting base stations (e.g., transmitting base station 1 502, ..., transmitting base station X 504, ...), where X can be substantially any integer, and a receiving base station 506. Further, although not shown, it is contemplated that system 500 can include any number of disparate receiving base stations.

Transmitting base stations 502-504 can each be substantially similar to transmitting base station 302 of FIG. 3 and/or base station 402 of FIG. 4, and receiving base station 506 can be substantially similar to receiving base station 304 of FIG. 3 and/or base station 402 of FIG. 4. Moreover, transmitting base stations 502-504 can each include a respective clock component (e.g., clock component 306 of FIG. 3, synchronization signal generation component (e.g., synchronization signal generation component 308 of FIG. 3, ...), and transmission component (e.g., transmission component 310 of FIG. 3, ...). Transmitting base station 1 502 can include clock component 1 508, synchronization signal generation component 1 510, and transmission component 1 512, ..., and transmitting base station X 504 can include clock component X 514, synchronization signal generation component X 516, and transmission component X 518. Further, receiving base station 506 can include a clock component 520 (e.g., clock component 312 of FIG. 3, ...), an adjustment component 522 (e.g., adjustment component 314 of FIG. 3, ...), and a reception component 524 (e.g., reception component 316 of FIG. 3, ...).

Transmitting base stations 502-504 can each further include a respective alignment type indication component 526-528. For instance, alignment type indication component 1 526 can indicate (e.g. by incorporating a flag in the synchronization signal yielded by synchronization signal generation component 1 510, ...) whether clock component 1 508 of transmitting base station 1 502 is GPS aligned, self aligned, or aligned from at least one differing base station. Similarly, alignment type indication component X 528 can provide notification concerning whether clock component X 514 of transmitting base station X 504 is GPS aligned, self aligned or aligned from at least one differing base station.

Receiving base station 506 can further include a source selection component 530 that can select a particular synchronization signal from a set of synchronization signals received via the low reuse channel. For instance, source selection component 530 can choose the particular synchronization signal based upon alignment type employed by transmitting base stations 502-504 from which the set of synchronization signals are obtained. By way of example, source selection component 530 can choose a synchronization signal from transmitting base station 1 502 as opposed to a synchronization signal from transmitting base station X 504 if transmitting base station 1 502 is recognized as being GPS aligned and transmitting base station X 504 is identified as being self aligned or aligned from at least one differing base station; however, it is to be appreciated that the claimed subject matter is not limited to the foregoing example. Additionally or alternatively, source selection component 530 can choose the particular synchronization signal based upon interference levels associated with the synchronization signals in the set; yet, the claimed subject matter is not so limited.

Figure 6:
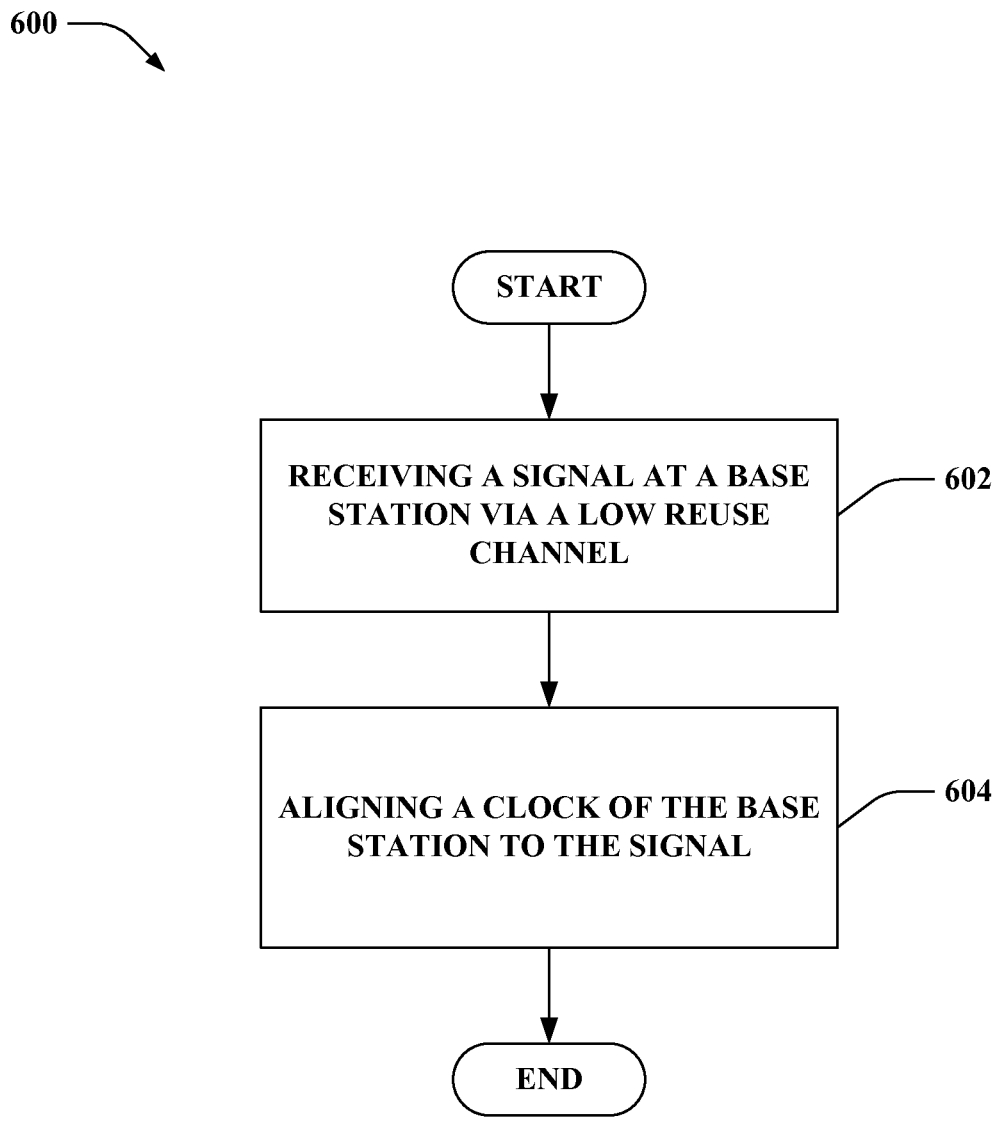
FIG. 6 is an illustration of an example methodology that facilitates synchronizing a base station in a wireless communication environment.
Figure 7:
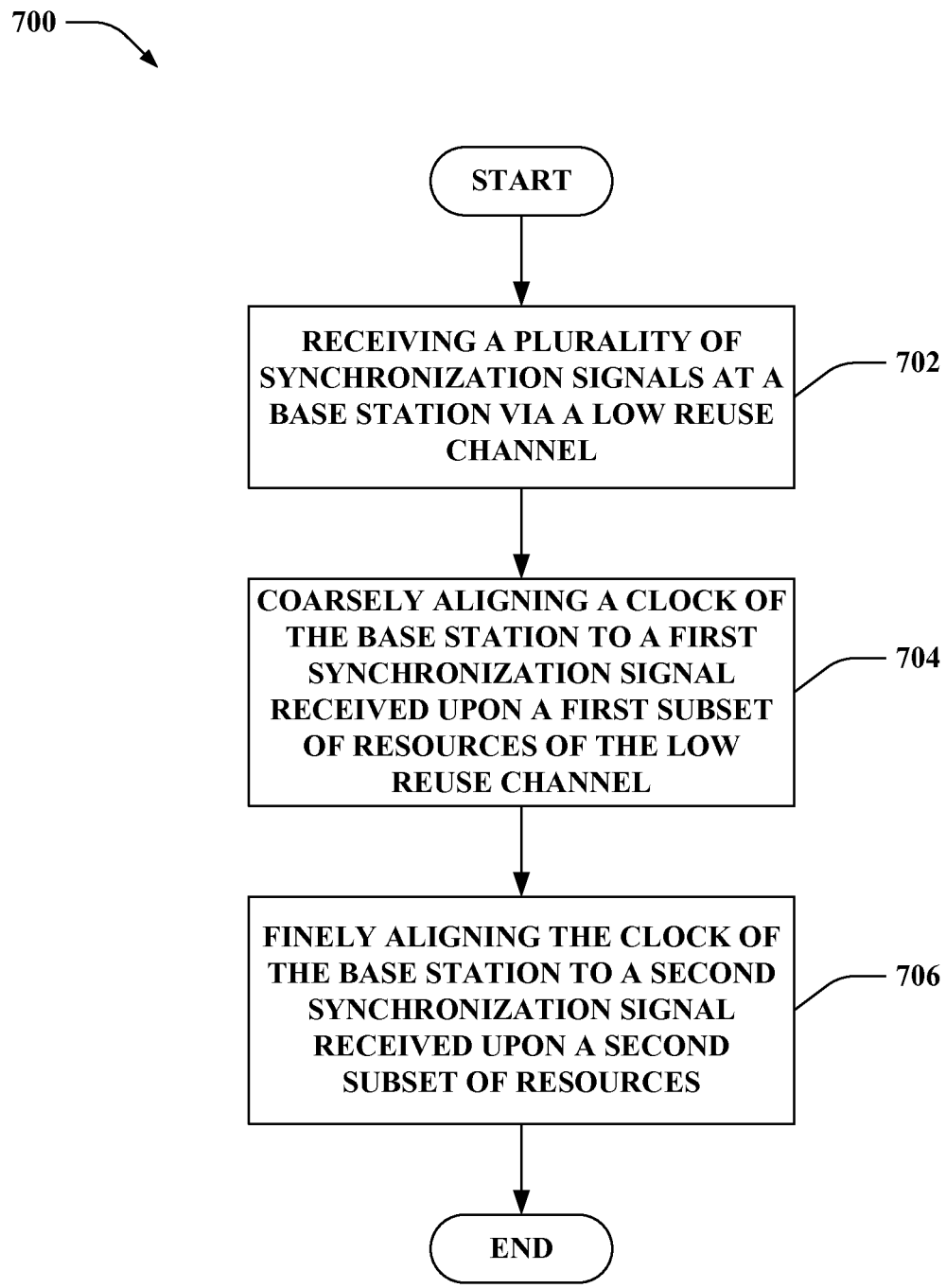
FIG. 7 is an illustration of an example methodology that facilitates tuning a clock of a base station in a wireless communication environment.
Figure 8:
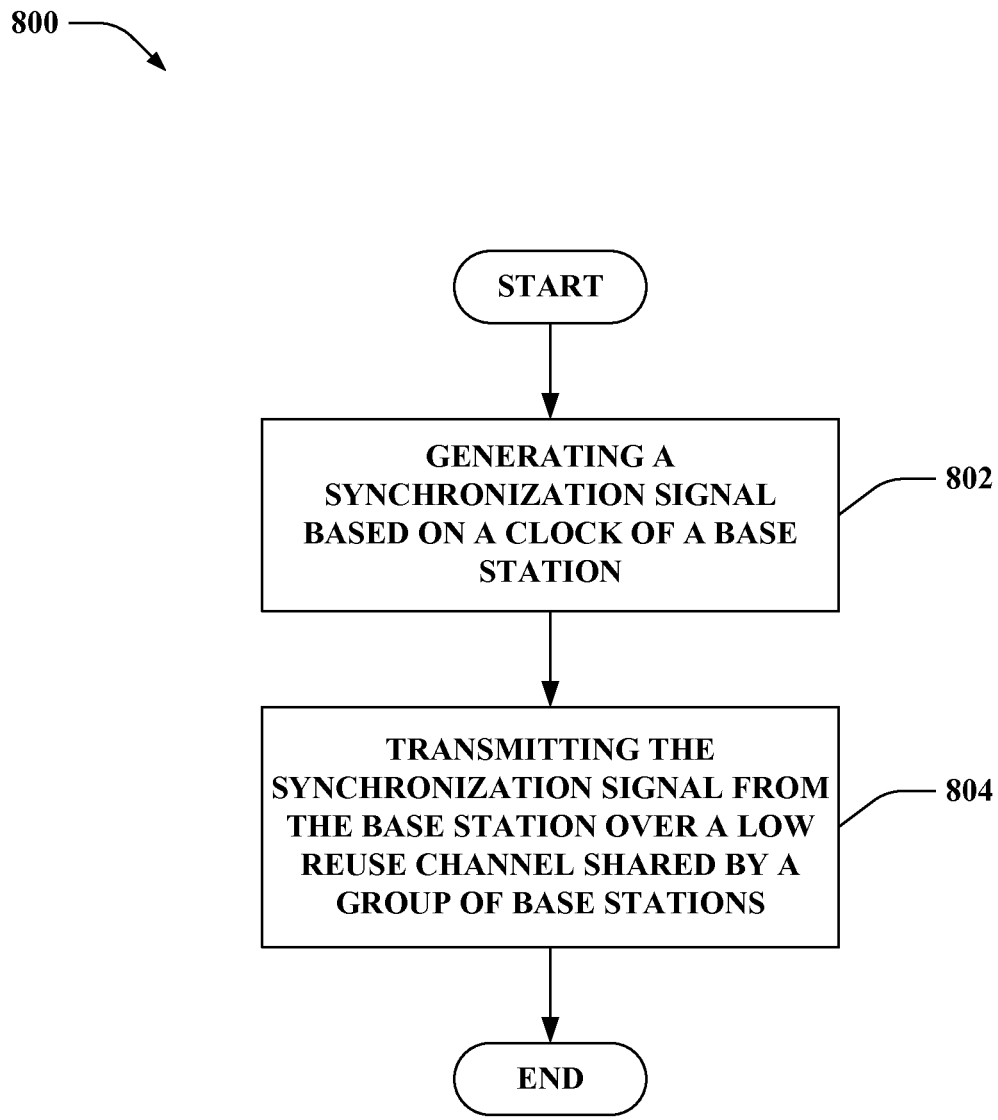
FIG. 8 is an illustration of an example methodology that facilitates disseminating synchronization signals in a wireless communication environment.

Referring to FIGS. 6-8, methodologies relating to synchronizing base stations in a wireless communication environment are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 6, illustrated is a methodology 600 that facilitates synchronizing a base station in a wireless communication environment. At 602, a signal can be received at a base station via a low reuse channel. For instance, the signal can be a synchronization signal. The low reuse channel can include a set of subcarriers in an orthogonal frequency division multiple access (OFDMA) system and/or a frequency band in a frequency division multiple access (FDMA) system. The signal can be transmitted over resources that correspond to one or more of time, period, frequency band, or spreading code employed for transmitting the signal. According to an example, the signal can be received from a given transmitting base station in a particular slot from a set of N slots included in the low reuse channel, where N can be an integer. Moreover, the particular slot from the set of N slots utilized by the given transmitting base station to transmit the signal can vary over time (e.g., as a function of a pseudorandom sequence associated with the given transmitting base station, . . . ).

At 604, a clock of the base station can be aligned to the signal. By way of example, timing and/or frequency of the base station can be tuned based upon the signal. Further, the signal upon which the clock of the base station is aligned can be selected from a set of signals received via the low reuse channel. For instance, the signal can be chosen based upon indications corresponding to each of the signals in the set that identify whether clocks of the respective transmitting base stations from which each of the signals are respectively received are Global Positioning System (GPS) aligned, self aligned, or aligned from at least one differing base station.

Referring now to FIG. 7, illustrated is a methodology 700 that facilitates tuning a clock of a base station in a wireless communication environment. At 702, a plurality of synchronization signals can be received at a base station via a low reuse channel. Additionally or alternatively, at least a subset of the plurality of synchronization signals can be received via a separate time/code divided channel. At 704, a clock of the base station can be coarsely aligned to a first synchronization signal received upon a first subset of resources of the low reuse channel. At 706, the clock of the base station can be finely aligned to a second synchronization signal received upon a second subset of resources. According to an example, the second subset of resources can be resource(s) of the low reuse channel (e.g., the low reuse channel can be used to provide fine timing, . . . ). By way of another example, the second subset of resources can be resource(s) of the separate channel (e.g., fine timing need not be provided via the same low reuse channel employed for providing coarse timing, . . . ); thus, upon establishing coarse timing, it is possible that fine timing can be carried on a the separate time/code divided channel (e.g., separate channel, . . . ) and need not be constrained to the low reuse channel. The second subset of resources can be reserved for transmission from at least one base station with at least a predetermined level of synchronous accuracy (e.g., transmitting base station(s) with fine timing, . . . ).

The low reuse channel can be shared by a group of base stations. Further, a first subset of base stations from the group can transmit respective synchronization signals utilizing resources identified for a coordinated silence upon the low reuse channel or the separate channel (e.g., the resources identified for the coordinated since can be the second subset of resources, . . . ). Moreover, a second subset (e.g., a remainder, . . . ) of the base stations from the group can forgo transmission of respective synchronization signals employing the identified resources.

With reference to FIG. 8, illustrated is a methodology 800 that facilitates disseminating synchronization signals in a wireless communication environment. At 802, a synchronization signal can be generated based on a clock of a base station. The clock of the base station, for instance, can be tuned based upon information obtained from a Global Positioning System (GPS) receiver, a disparate base station, or the like. According to another illustration, the clock of the base station can be self aligned. By way of example, the synchronization signal can be a positioning reference signal (PRS); however, the claimed subject matter is not so limited.

At 804, the synchronization signal can be transmitted from the base station over a low reuse channel shared by a group of base stations. The low reuse channel can include a set of subcarriers in an orthogonal frequency division multiple access (OFDMA) system and/or a frequency band in a frequency division multiple access (FDMA) system. The synchronization signal can be transmitted over resources that correspond to one or more of time, period, frequency band, or spreading code employed for transmitting the synchronization signal. According to an example, the synchronization signal can be transmitted in a particular transmission slot from a set of N transmission slots included in the low reuse channel, where N can be an integer. Moreover, the particular transmission slot from the set of N transmission slots utilized to transmit the synchronization signal can vary over time (e.g. as a function of a pseudorandom sequence associated with the base station, . . . ). By way of another example, the base station can indicate whether its clock is one of GPS aligned, self aligned, or aligned from at least one differing base station.

According to an example, the synchronization signal can be transmitted over the low reuse channel utilizing resources associated with coarse timing. Moreover, the synchronization signal can be transmitted over the low reuse channel or a separate channel employing resources associated with fine timing when the clock of the base station provides at least a predetermined level of synchronous accuracy. Alternatively, transmission of the synchronization signal over the low reuse channel or the separate channel using resources associated with fine timing can be inhibited when the clock of the base station lacks at least a predetermined level of synchronous accuracy. When transmission of the synchronization signal is inhibited, a disparate synchronization signal can be received via the resources associated with fine timing upon the low reuse channel or the separate channel and the clock of the base station can be aligned to the disparate synchronization signal.

The low reuse channel can be shared by a group of base stations. Further, a first subset of base stations from the group can transmit respective synchronization signals utilizing resources identified for a coordinated silence upon the low reuse channel. Moreover, a second subset (e.g., a remainder, . . . ) of the base stations from the group can forgo transmission of respective synchronization signals employing the identified resources upon the low reuse channel.

It will be appreciated that, in accordance with one or more aspects described herein, inferences can be made regarding synchronizing base stations in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a particular synchronization signal from a set of received synchronization signals to employ for tuning a clock of a base station. By way of further illustration, an inference can be made related to identifying a level of synchronous accuracy of a base station. It will be appreciated that the foregoing examples are illustrative in nature and are not intended to limit the number of inferences that can be made or the manner in which such inferences are made in conjunction with the various embodiments and/or methods described herein.

Figure 9:
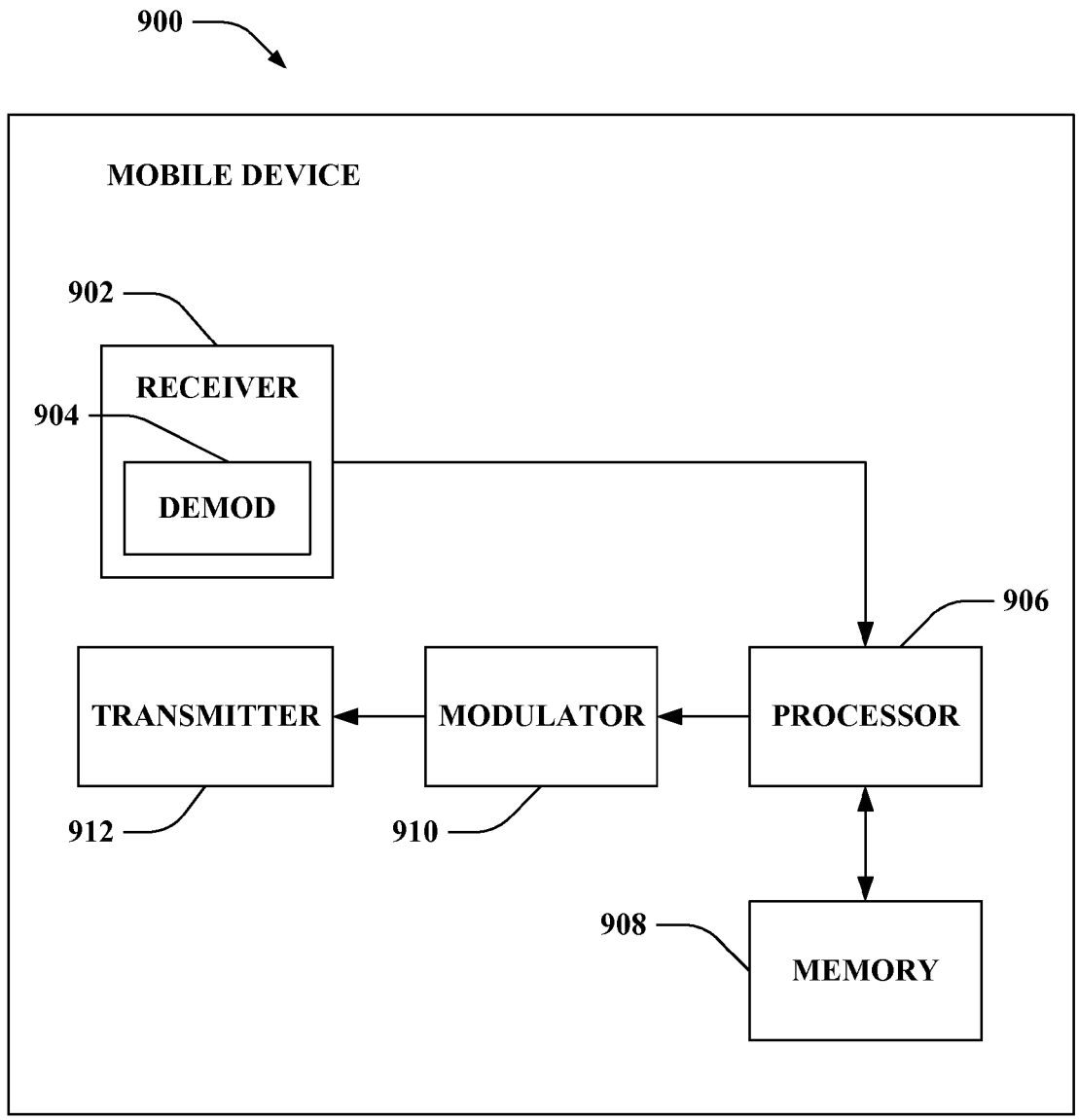
FIG. 9 is an illustration of an example mobile device that can be employed in connection with various aspects described herein.

FIG. 9 is an illustration of a mobile device 900 that can be employed in connection with various aspects described herein. Mobile device 900 comprises a receiver 902 that receives a signal from, for instance, a receive antenna (not shown), and performs typical actions thereon (e.g., filters, amplifies, downconverts, etc.) the received signal and digitizes the conditioned signal to obtain samples. Receiver 902 can be, for example, an MMSE receiver, and can comprise a demodulator 904 that can demodulate received symbols and provide them to a processor 906 for channel estimation. Processor 906 can be a processor dedicated to analyzing information received by receiver 902 and/or generating information for transmission by a transmitter 912, a processor that controls one or more components of mobile device 900, and/or a processor that both analyzes information received by receiver 902, generates information for transmission by transmitter 912, and controls one or more components of mobile device 900.

Mobile device 900 can additionally comprise memory 908 that is operatively coupled to processor 906 and that can store data to be transmitted, received data, and any other suitable information related to performing the various actions and functions set forth herein.

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Mobile device 900 still further comprises a modulator 910 and a transmitter 912 that transmits data, signals, etc. to a base station. Although depicted as being separate from the processor 906, it is to be appreciated that modulator 910 can be part of processor 906 or a number of processors (not shown).

Figure 10:
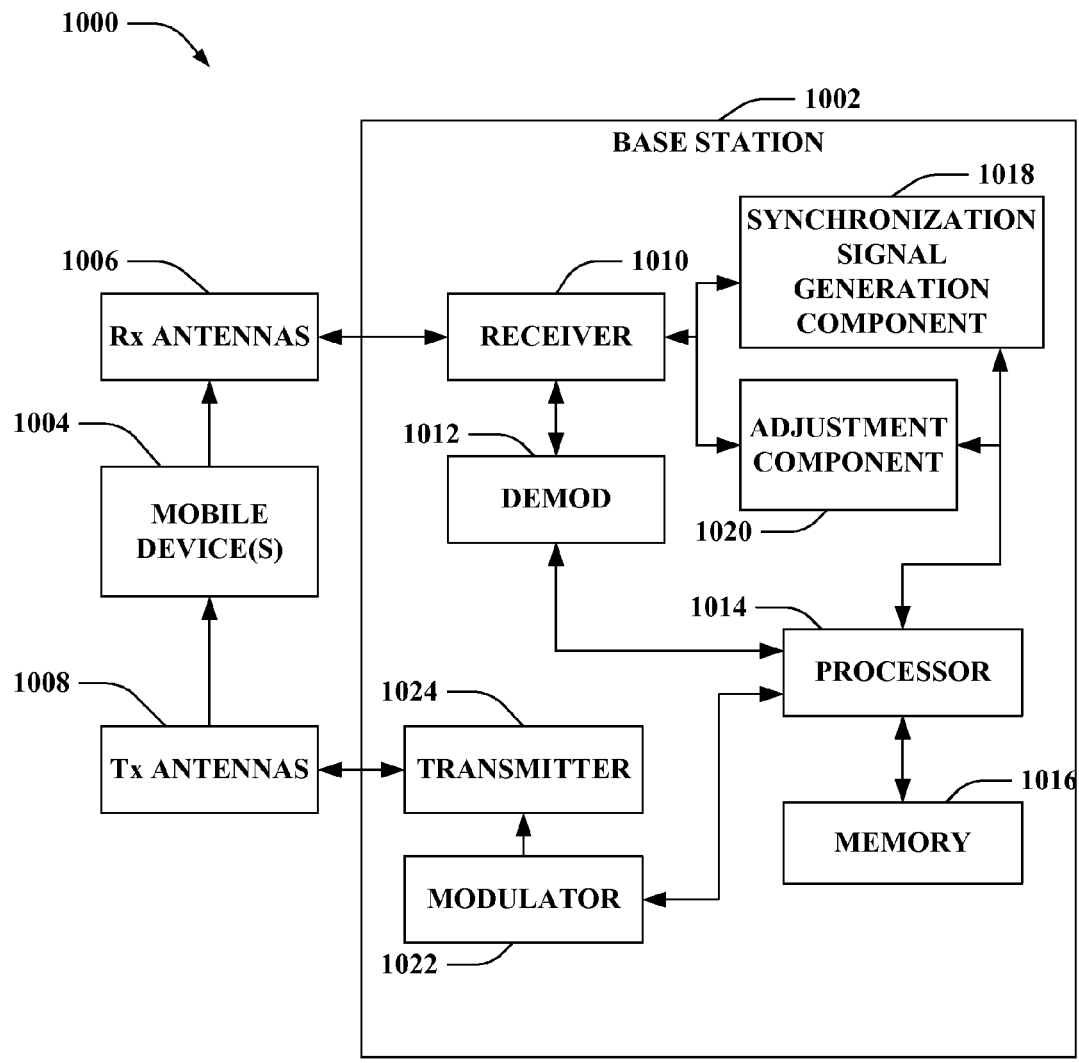
FIG. 10 is an illustration of an example system that synchronizes clocks of base stations in a wireless communication environment.

FIG. 10 is an illustration of a system 1000 that synchronizes clocks of base stations in a wireless communication environment. System 1000 comprises a base station 1002 (e.g., access point, . . . ) with a receiver 1010 (e.g., reception component, . . . ) that receives signal(s) from one or more mobile devices 1004 through a plurality of receive antennas 1006, and a transmitter 1024 (e.g., transmission component, . . . ) that transmits to the one or more mobile devices 1004 through a transmit antenna 1008. Moreover, base station 1002 can receive signal(s) with receiver 1010 from one or more disparate base stations through the plurality of receive antennas 1006 and/or transmit to one or more disparate base stations with transmitter 1024 through the transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores data to be transmitted to or received from mobile device(s) 1004 and/or disparate base station(s) and/or any other suitable information related to performing the various actions and functions set forth herein. Processor 1014 is further coupled to a synchronization signal generation component 1018 and/or an adjustment component 1020. Synchronization signal generation component 1018 can be substantially similar to synchronization signal generation component 408 of FIG. 4 and/or adjustment component 1020 can be substantially similar to adjustment component 410 of FIG. 4. Synchronization signal generation component 1018 can yield a synchronization signal to be transmitted over a low reuse channel based upon a clock of base station 1002. Moreover, adjustment component 1020 can align the clock of base station 1002 to a synchronization signal received from a disparate base station via the low reuse channel. Further, although not shown, it is to be appreciated that base station 1002 can further include a clock component, a negotiation component, an alignment type indication component, and/or a source selection component. Base station 1002 can further include a modulator 1022. Modulator 1022 can multiplex a frame for transmission by a transmitter 1024 through antennas 1008 to mobile device(s) 1004 in accordance with the aforementioned description. Although depicted as being separate from the processor 1014, it is to be appreciated that synchronization signal generation component 1018, adjustment component 1020, and/or modulator 1022 can be part of processor 1014 or a number of processors (not shown).

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") (e.g., mobile device, . . . ) moves through such a network, the access terminal may be served in certain locations by access nodes ("ANs") (e.g., base stations, . . . ) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node (e.g., macro cell base station, . . . ). A node that provides coverage over a relatively small area (e.g., a residence) may be referred to as a femto node (e.g., femto cell base station, . . . ). A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, macro cell base station, and so on. Also, a femto node may be configured or referred to as a Home NodeB, Home eNodeB, access point base station, femto cell, femto cell base station, and so on.

Figure 11:
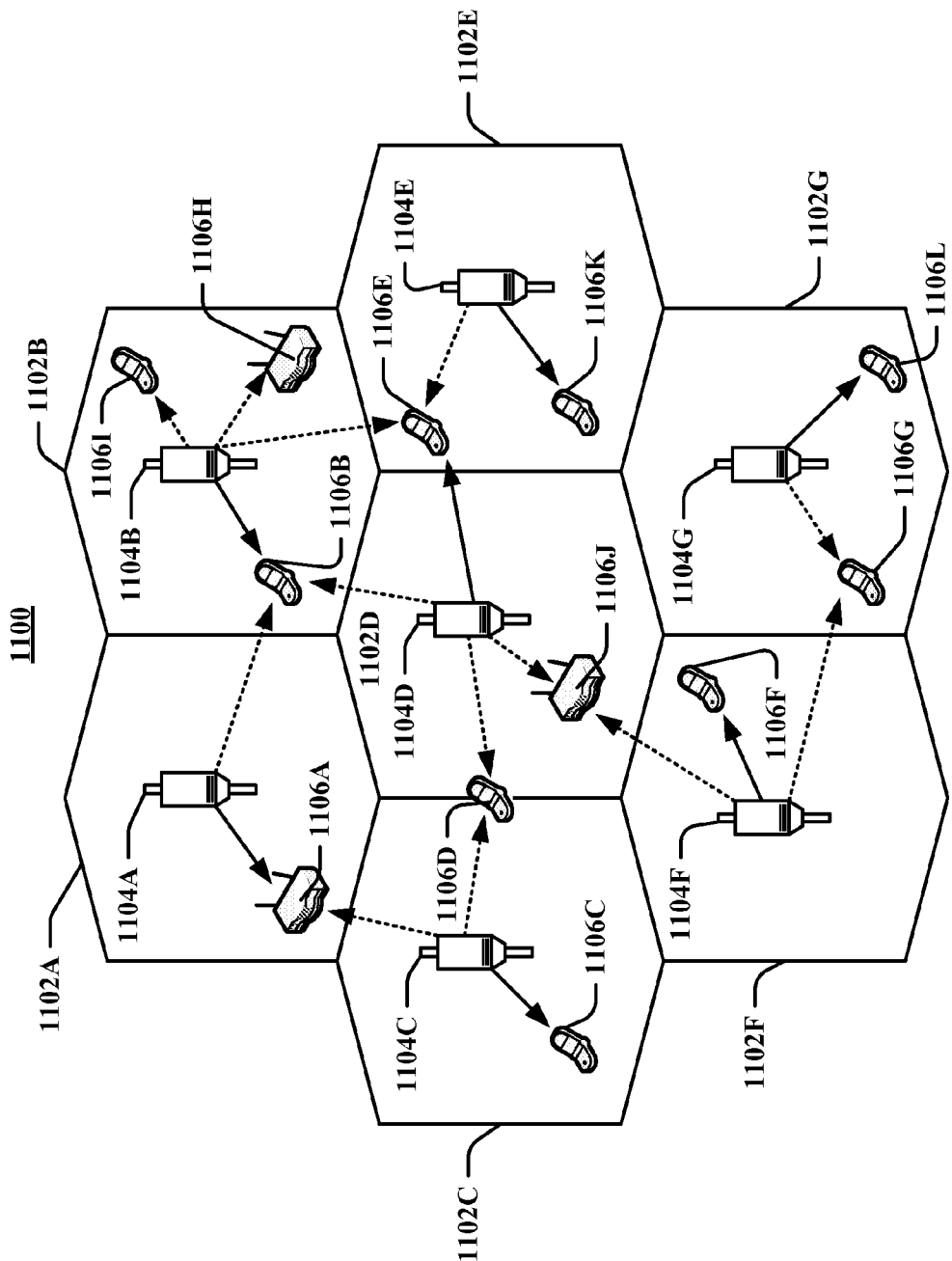
FIG. 11 is an illustration of an example wireless communication system, configured to support a number of users, in which the teachings herein may be implemented.

FIG. 11 illustrates a wireless communication system 1100, configured to support a number of users, in which the teachings herein may be implemented. System 1100 provides communication for multiple cells 1102, such as, for example, macro cells 1102A-1102G, with each cell being serviced by a corresponding access node 1104 (e.g., access nodes 1104A-1104G). As shown in FIG. 11, access terminals 1106 (e.g., access terminals 1106A-1106L) may be dispersed at various locations throughout the system 1100 over time. Each access terminal 1106 may communicate with one or more access nodes 1104 on a forward link ("FL") and/or a reverse link ("RL") at a given moment, depending upon whether the access terminal 1106 is active and whether it is in soft handoff, for example. The wireless communication system 1100 may provide service over a large geographic region. For example, macro cells 1102A-1102G may cover a few blocks in a neighborhood.

Figure 12:
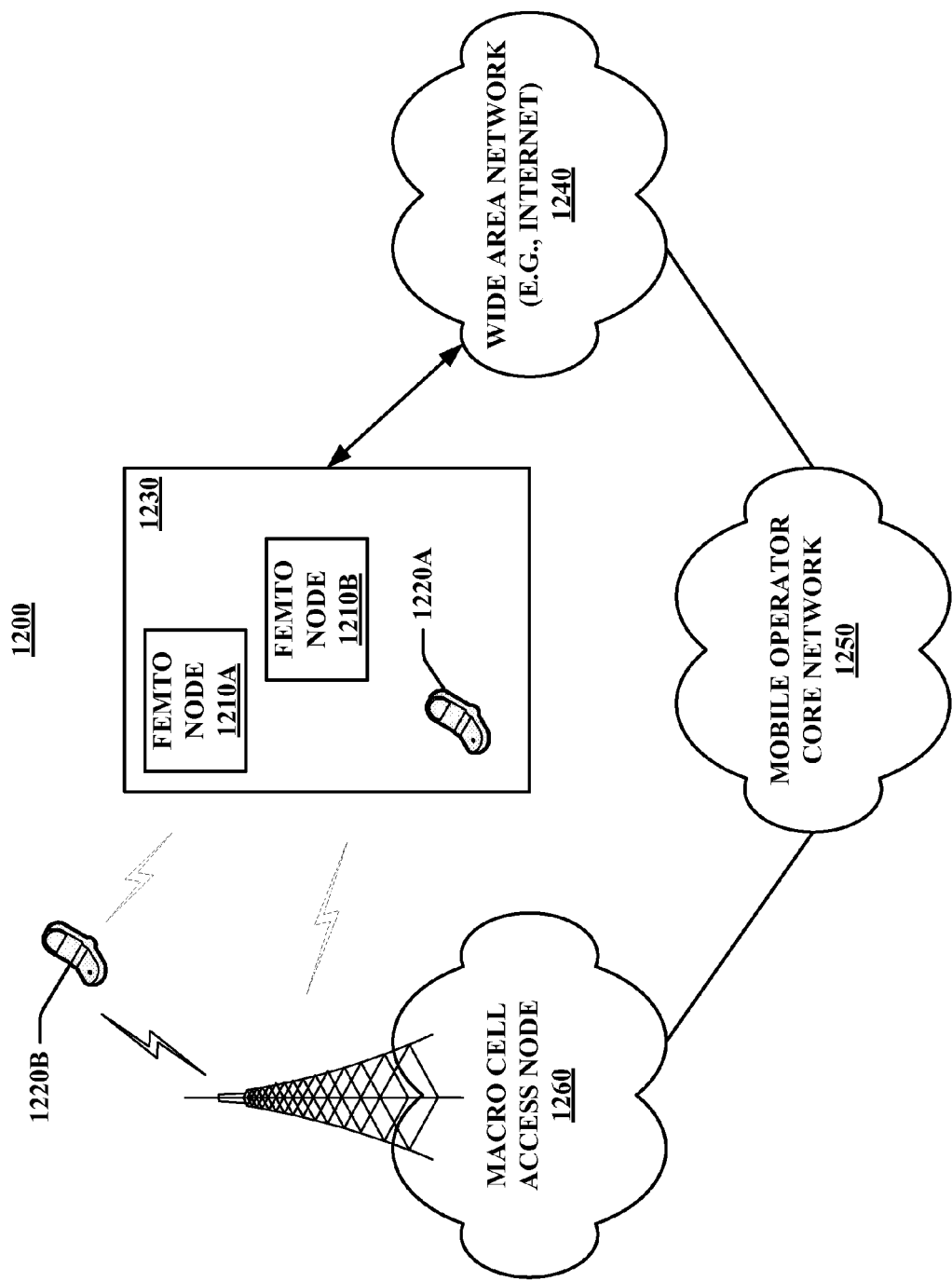
FIG. 12 is an illustration of an example communication system where one or more femto nodes are deployed within a network environment.

FIG. 12 illustrates an exemplary communication system 1200 where one or more femto nodes are deployed within a network environment. Specifically, system 1200 includes multiple femto nodes 1210 (e.g. femto nodes 1210A and 1210B) installed in a relatively small scale network environment (e.g., in one or more user residences 1230). Each femto node 1210 may be coupled to a wide area network 1240 (e.g., the Internet) and a mobile operator core network 1250 via a DSL router, a cable modem, a wireless link, or other connectivity means (not shown). As will be discussed below, each femto node 1210 may be configured to serve associated access terminals 1220 (e.g., access terminal 1220A) and, optionally, alien access terminals 1220 (e.g., access terminal 1220B). In other words, access to femto nodes 1210 may be restricted whereby a given access terminal 1220 may be served by a set of designated (e.g., home) femto node(s) 1210 but may not be served by any non-designated femto nodes 1210 (e.g., a neighbor's femto node 1210).

Figure 13:
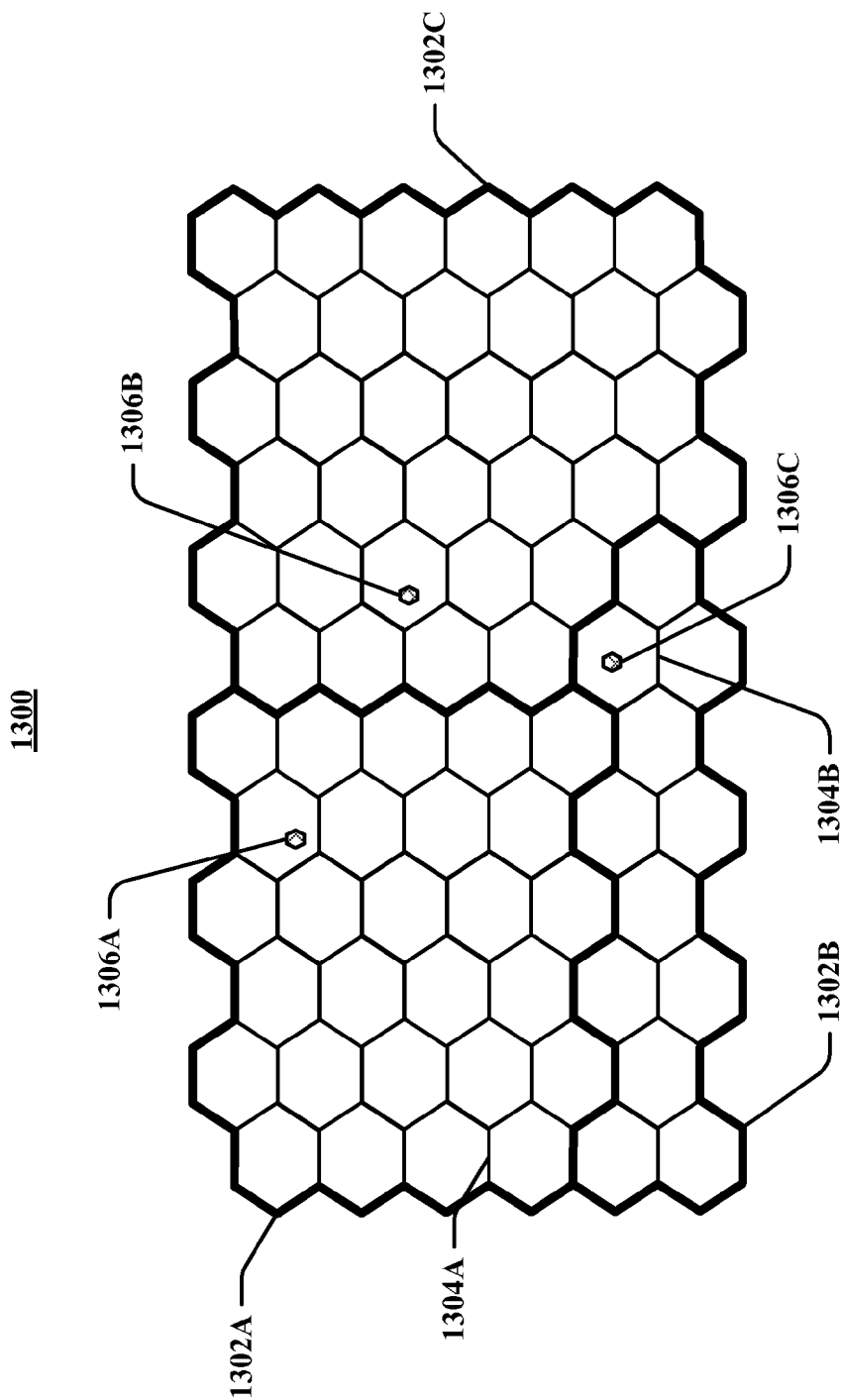
FIG. 13 is an illustration of an example of a coverage map where several tracking areas (or routing areas or location areas) are defined, each of which includes several macro coverage areas.

FIG. 13 illustrates an example of a coverage map 1300 where several tracking areas 1302 (or routing areas or location areas) are defined, each of which includes several macro coverage areas 1304. Here, areas of coverage associated with tracking areas 1302A, 1302B, and 1302C are delineated by the wide lines and the macro coverage areas 1304 are represented by the hexagons. The tracking areas 1302 also include femto coverage areas 1306. In this example, each of the femto coverage areas 1306 (e.g., femto coverage area 1306C) is depicted within a macro coverage area 1304 (e.g., macro coverage area 1304B). It should be appreciated, however, that a femto coverage area 1306 may not lie entirely within a macro coverage area 1304. In practice, a large number of femto coverage areas 1306 may be defined with a given tracking area 1302 or macro coverage area 1304. Also, one or more pico coverage areas (not shown) may be defined within a given tracking area 1302 or macro coverage area 1304.

Referring again to FIG. 12, the owner of a femto node 1210 may subscribe to mobile service, such as, for example, 3G mobile service, offered through the mobile operator core network 1250. In addition, an access terminal 1220 may be capable of operating both in macro environments and in smaller scale (e.g., residential) network environments. In other words, depending on the current location of the access terminal 1220, the access terminal 1220 may be served by an access node 1260 of the macro cell mobile network 1250 or by any one of a set of femto nodes 1210 (e.g., the femto nodes 1210A and 1210B that reside within a corresponding user residence 1230). For example, when a subscriber is outside his home, he is served by a standard macro access node (e.g., node 1260) and when the subscriber is at home, he is served by a femto node (e.g., node 1210A). Here, it should be appreciated that a femto node 1210 may be backward compatible with existing access terminals 1220.

A femto node 1210 may be deployed on a single frequency or, in the alternative, on multiple frequencies. Depending on the particular configuration, the single frequency or one or more of the multiple frequencies may overlap with one or more frequencies used by a macro node (e.g. node 1260).

In some aspects, an access terminal 1220 may be configured to connect to a preferred femto node (e.g., the home femto node of the access terminal 1220) whenever such connectivity is possible. For example, whenever the access terminal 1220 is within the user's residence 1230, it may be desired that the access terminal 1220 communicate only with the home femto node 1210.

In some aspects, if the access terminal 1220 operates within the macro cellular network 1250 but is not residing on its most preferred network (e.g., as defined in a preferred roaming list), the access terminal 1220 may continue to search for the most preferred network (e.g., the preferred femto node 1210) using a Better System Reselection ("BSR"), which may involve a periodic scanning of available systems to determine whether better systems are currently available, and subsequent efforts to associate with such preferred systems. With the acquisition entry, the access terminal 1220 may limit the search for specific band and channel. For example, the search for the most preferred system may be repeated periodically. Upon discovery of a preferred femto node 1210, the access terminal 1220 selects the femto node 1210 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1210 that reside within the corresponding user residence 1230). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 14:
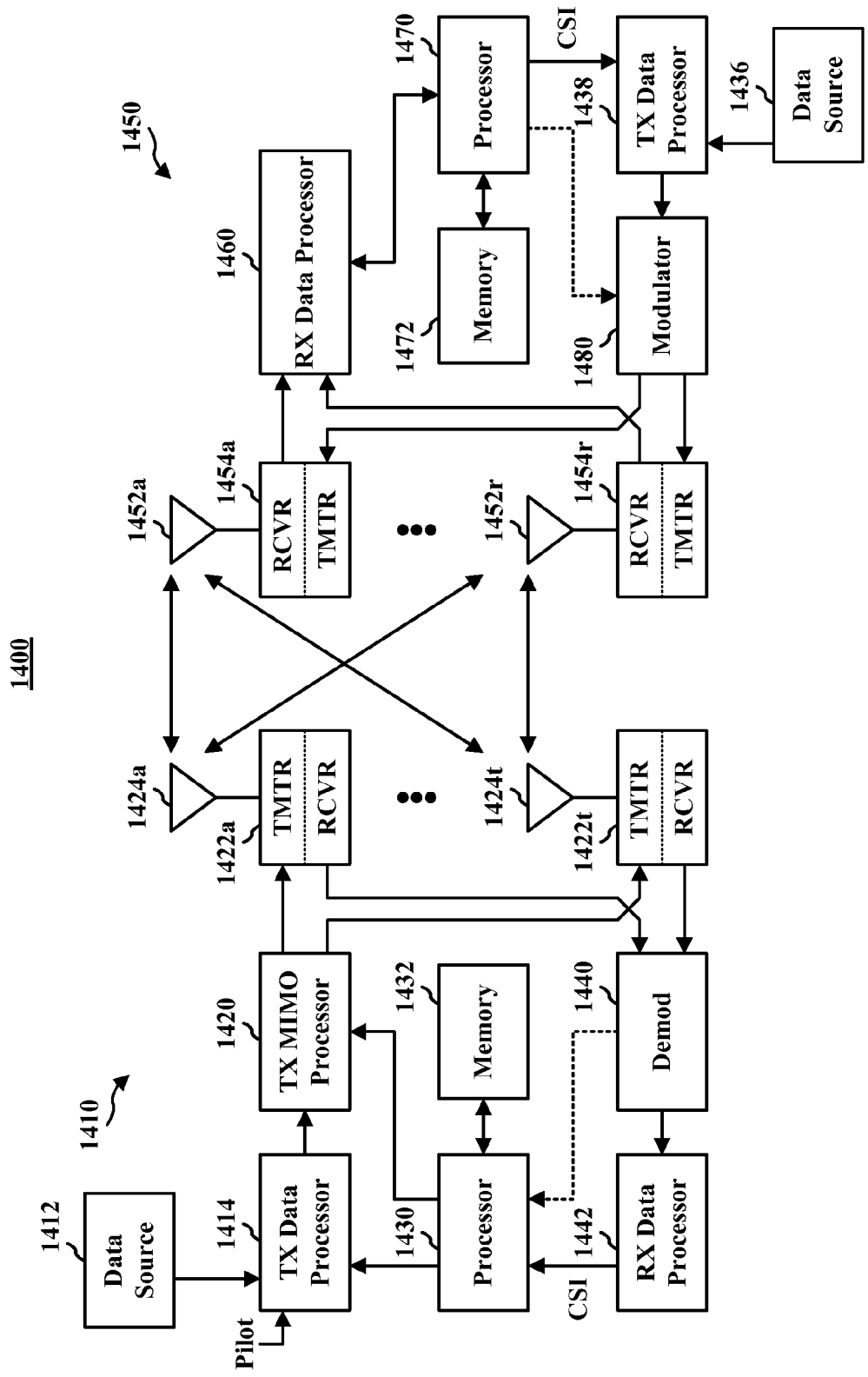
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-5, 9-13 and 15-16) and/or methods (FIGS. 6-8) described herein to facilitate wireless communication there between.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430. Memory 1432 can store program code, data, and other information used by processor 1430 or other components of base station 1410.

The modulation symbols for the data streams can be provided to a TX MIMO processor 1420, which can further process the modulation symbols (e.g., for OFDM). TX MIMO processor 1420 then provides $N_T$ modulation symbol streams to $N_T$ transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1422a through 1422t are transmitted from $N_T$ antennas 1424a through 1424t, respectively.

At mobile device 1450, the transmitted modulated signals are received by $N_R$ antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the $N_R$ received symbol streams from $N_R$ receivers 1454 based on a particular receiver processing technique to provide $N_T$ "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which preceding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which preceding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 15:
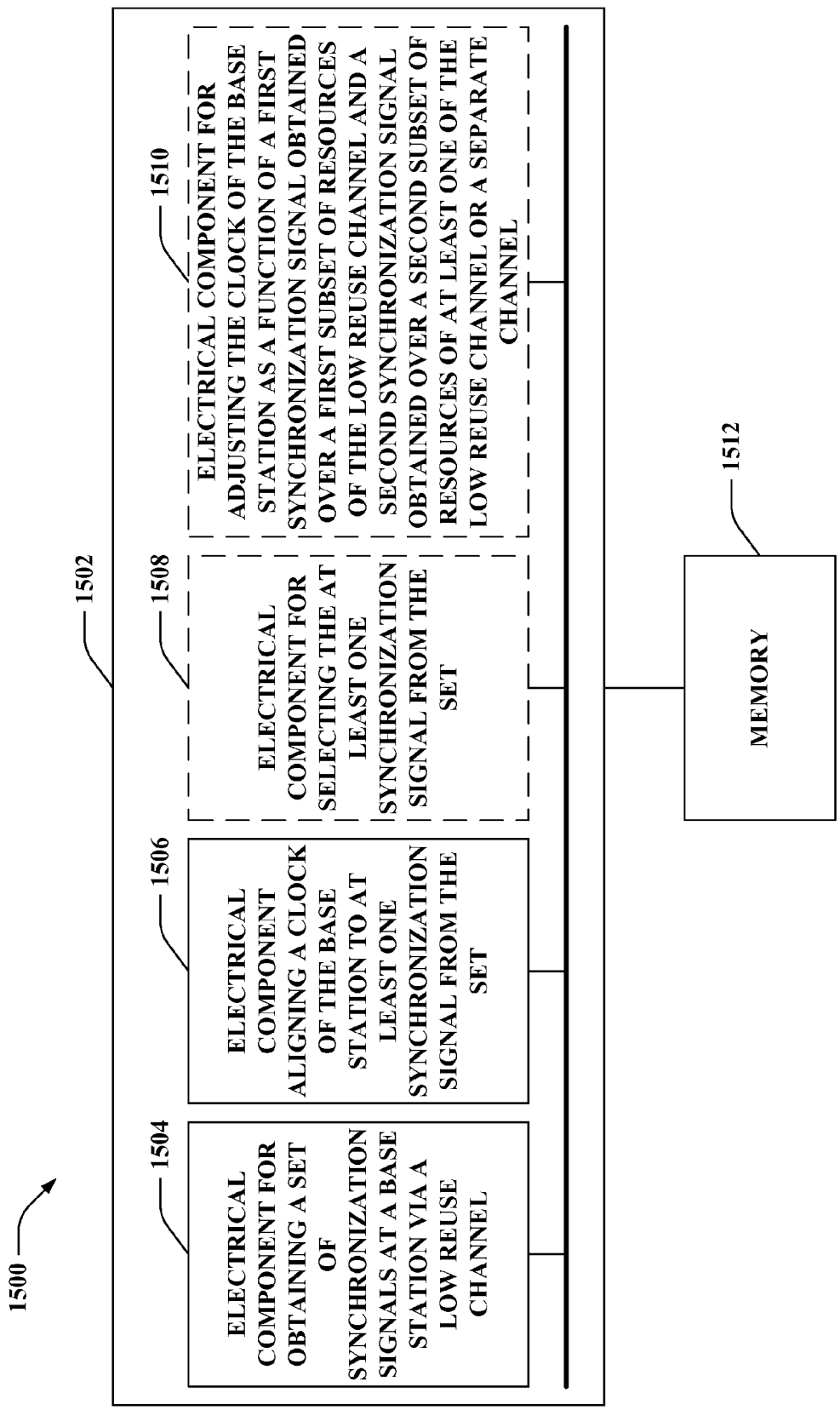
FIG. 15 is an illustration of an example system that enables synchronizing a clock of a base station in a wireless communication environment.

With reference to FIG. 15, illustrated is a system 1500 that enables synchronizing a clock of a base station in a wireless communication environment. For example, system 1500 can reside at least partially within a base station. It is to be appreciated that system 1500 is represented as including functional blocks, which can be functional blocks that represent functions implemented by a processor, software, or combination thereof (e.g., firmware). System 1500 includes a logical grouping 1502 of electrical components that can act in conjunction. For instance, logical grouping 1502 can include an electrical component for obtaining a set of synchronization signals at a base station via a low reuse channel 1504. Moreover, logical grouping 1502 can include an electrical component for aligning a clock of the base station to at least one synchronization signal from the set 1506. Logical grouping 1502 can also optionally include an electrical component for selecting the at least one synchronization signal from the set 1508. Additionally, logical grouping 1502 can optionally include an electrical component for adjusting the clock of the base station as a function of a first synchronization signal obtained over a first subset of resources of the low reuse channel and a second synchronization signal obtained over a second subset of resources of at least one of the low reuse channel or a separate channel 1510. Additionally, system 1500 can include a memory 1512 that retains instructions for executing functions associated with electrical components 1504, 1506, 1508, and 1510. While shown as being external to memory 1512, it is to be understood that one or more of electrical components 1504, 1506, 1508, and 1510 can exist within memory 1512.

Figure 16:
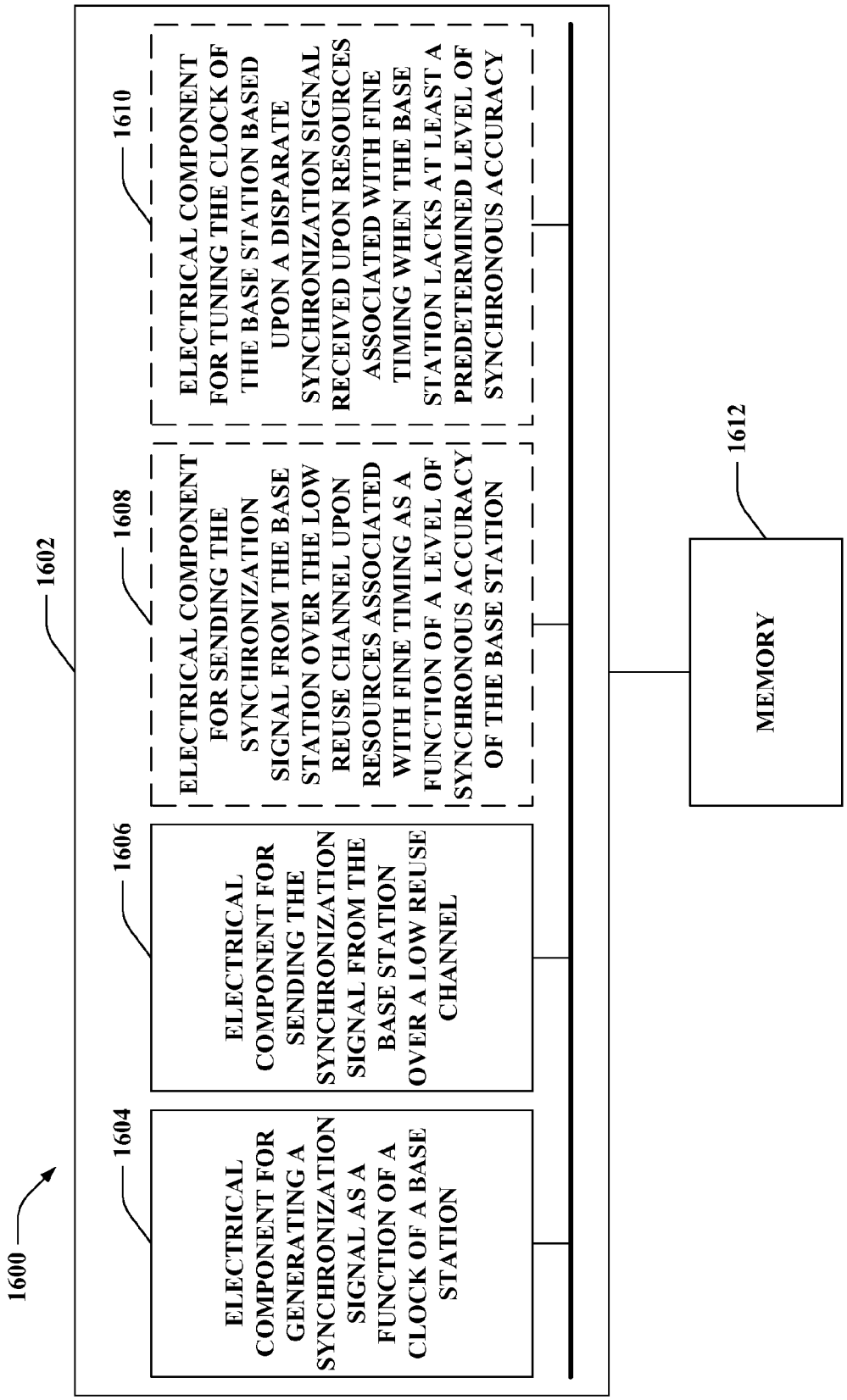
FIG. 16 is an illustration of an example system that enables disseminating a synchronization signal in a wireless communication environment.

With reference to FIG. 16, illustrated is a system 1600 that enables disseminating a synchronization signal in a wireless communication environment. For example, system 1600 can reside at least partially within a base station. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for generating a synchronization signal as a function of a clock of a base station 1604. Further, logical grouping 1602 can include an electrical component for sending the synchronization signal from the base station over a low reuse channel 1606. Moreover, logical grouping 1602 can optionally include an electrical component for sending the synchronization signal from the base station over the low reuse channel upon resources associated with fine timing as a function of a level of synchronous accuracy of the base station 1608. Logical grouping 1602 can also optionally include an electrical component for tuning the clock of the base station upon a disparate synchronization signal received upon resources associated with fine timing when the base station lacks at least a predetermined level of synchronous accuracy 1610. Additionally, system 1600 can include a memory 1612 that retains instructions for executing functions associated with electrical components 1604, 1606, 1608, and 1610. While shown as being external to memory 1612, it is to be understood that one or more of electrical components 1604, 1606, 1608, and 1610 can exist within memory 1612.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method, comprising:
   receiving a first signal at a base station via a channel, the first signal comprising first synchronization information having a first level of accuracy;
   tuning a clock of the base station a first time for a first synchronization of the clock based on the first synchronization information;
   receiving a second signal at the base station via the channel, the second signal comprising second synchronization information having a second level of accuracy that is higher than the first level of accuracy; and
   tuning the clock of the base station a second time for the first synchronization of the clock based on the second synchronization information.

2. The method of claim 1, wherein the first signal is received upon a first subset of resources of the channel, and wherein the second signal is received upon a second subset of resources, wherein the second subset of resources is reserved for transmission from at least one base station with at least a predetermined level of synchronous accuracy.

3. The method of claim 1, wherein a group of base stations share the channel, and a first subset of base stations from the group transmit respective signals utilizing resources identified for a coordinated silence upon the channel and a second subset of base stations from the group forgo transmission of respective signals employing the resources identified for the coordinated silence upon the channel.

4. The method of claim 1, further comprising receiving the first signal from a given transmitting base station in a particular slot from a set of N slots included in the channel, where N is an integer.

5. The method of claim 4, wherein the particular slot from the set of N slots included in the channel utilized by the given transmitting base station varies over time.

6. The method of claim 1, wherein the channel comprises one of a set of subcarriers in an orthogonal frequency division multiple access (OFDMA) system or a frequency band in a frequency division multiple access (FDMA) system.

7. The method of claim 1, further comprising selecting the first signal from a set of signals received via the channel.

8. The method of claim 1, wherein the first signal is a synchronization signal.

9. A wireless communications apparatus, comprising:
   at least one processor configured to:
      receive a first synchronization signal at a base station via a channel, the first synchronization signal comprising first synchronization information having a first level of accuracy;
      tune a clock of the base station a first time for a first synchronization of the clock based on the first synchronization information;
      receive a second synchronization signal at the base station via the channel, the second synchronization signal comprising second synchronization information having a second level of accuracy that is higher than the first level of accuracy; and tune the clock of the base station a second time for the first synchronization of the clock based on the second synchronization information.

10. The wireless communications apparatus of claim 9, wherein the first synchronization signal is received upon a first subset of resources of the channel, and wherein the second synchronization signal is received upon a second subset of resources of one or more of the channel or a separate channel, wherein the second subset of resources is reserved for transmission from at least one base station with at least a predetermined level of synchronous accuracy.

11. The wireless communications apparatus of claim 9, wherein a group of base stations share the channel, and a first subset of base stations from the group transmit respective synchronization signals utilizing resources reserved for a coordinated silence upon the channel and a second subset of base stations from the group halt transmission of respective synchronization signals employing the resources reserved for the coordinated silence upon the channel.

12. The wireless communications apparatus of claim 9, wherein the at least one processor is further configured to receive the first synchronization signal from a particular transmitting base station in a particular time varying slot from a set of N slots included in the channel, where N is an integer.

13. The wireless communications apparatus of claim 9, wherein the channel comprises one of a set of subcarriers in an orthogonal frequency division multiple access (OFDMA) system or a frequency band in a frequency division multiple access (FDMA) system.

14. The wireless communications apparatus of claim 9, wherein the at least one processor is further configured to choose the first synchronization signal from a set of synchronization signals respectively received from a plurality of transmitting base stations via the channel.

15. An apparatus, comprising:
means for receiving a first signal at a base station via a channel, the first signal comprising first synchronization information having a first level of accuracy;
means for tuning a clock of the base station a first time for a first synchronization of the clock based on the first synchronization information;
means for receiving a second signal at the base station via the channel, the second signal comprising second synchronization information having a second level of accuracy that is higher than the first level of accuracy; and
means for tuning the clock of the base station a second time for the first synchronization of the clock based on the second synchronization information.

16. The apparatus of claim 15, further comprising means for selecting the first synchronization signal from a set of synchronization signals.

17. The apparatus of claim 15, wherein the first synchronization signal is obtained over a first subset of resources of the channel and the second synchronization signal is obtained over a second subset of resources of at least one of the channel or a separate channel.

18. The apparatus of claim 15, wherein a group of base stations share the channel, and a first subset of base stations from the group transmit respective synchronization signals utilizing resources reserved for a coordinated silence upon the channel and a second subset of base stations from the group inhibit transmission of respective synchronization signals employing the resources reserved for the coordinated silence upon the channel.

19. The apparatus of claim 15, wherein a corresponding transmission slot during which each synchronization signal of a set of synchronization signals is respectively transmitted from a corresponding transmitting base station varies as a function of time.

20. A computer program product, comprising:
a non-transitory computer-readable medium comprising:
code for causing at least one computer to receive a first signal at a base station via a channel, the first signal comprising first synchronization information having a first level of accuracy;
code for causing at least one computer to tune a clock of the base station a first time based for a first synchronization of the clock on the first synchronization information;
code for causing at least one computer to receive a second signal at the base station via the channel, the second signal comprising second synchronization information having a second level of accuracy that is higher than the first level of accuracy; and
code for causing at least one computer to tune the clock of the base station a second time for the first synchronization of the clock based on the second synchronization information.

21. The computer program product of claim 20, wherein the first signal is received upon a first subset of resources of the channel, and the second signal is received upon a second subset of resources, wherein the second subset of resources is reserved for transmission from at least one base station with at least a predetermined level of synchronous accuracy.

22. The computer program product of claim 20, wherein a group of base stations share the channel, and a first subset of base stations from the group transmit respective signals utilizing resources identified for a coordinated silence upon the channel and a second subset of base stations from the group forgo transmission of respective signals employing the resources identified for the coordinated silence upon the channel.

23. The computer program product of claim 20, wherein the computer-readable medium further comprises code for causing at least one computer to receive the first signal from a given transmitting base station in a particular slot from a set of N slots included in the channel, where N is an integer.

24. The computer program product of claim 23, wherein the particular slot from the set of N slots included in the channel utilized by the given transmitting base station varies over time.

25. The computer program product of claim 20, wherein the channel comprises one of a set of subcarriers in an orthogonal frequency division multiple access (OFDMA) system or a frequency band in a frequency division multiple access (FDMA) system.

26. The computer program product of claim 20, wherein the computer-readable medium further comprises code for causing at least one computer to choose the first signal from a set of signals received via the channel.

27. An apparatus, comprising:
a reception component that receives a first synchronization signal at a receiving base station via a channel, the first synchronization signal comprising first synchronization information having a first level of accuracy;
an adjustment component that tunes a clock of the receiving base station a first time for a first synchronization of the clock based on the first synchronization signal,
the reception component further receiving a second synchronization signal at the receiving base station via the channel, the second synchronization signal comprising second synchronization information having a second level of accuracy that is higher than the first level of accuracy; and the adjustment component further tuning the clock of the receiving base station a second time for the first synchronization of the clock based on the second synchronization information.

28. The apparatus of claim 27, further comprising a source selection component that selects the first synchronization signal utilized by the adjustment component from a set of synchronization signals received via the channel.

29. A method, comprising:
generating a first synchronization signal based on a clock of a base station, the first synchronization signal comprising first synchronization information having a first level of accuracy;
transmitting the first synchronization signal from the base station over a channel shared by a group of base stations for use in a first synchronization;
generating a second synchronization signal based on the clock of the base station, the second synchronization signal comprising second synchronization information having a second level of accuracy that is higher than the first level of accuracy; and
transmitting the second synchronization signal from the base station over the channel for use in the first synchronization.

30. The method of claim 29, wherein the first synchronization signal is transmitted over resources that correspond to one or more of time, period, frequency band, or spreading code employed for transmitting the first synchronization signal.

31. The method of claim 29, wherein the second level of accuracy is at least a predetermined level of synchronous accuracy.

32. The method of claim 31, further comprising inhibiting transmission of the second synchronization signal when the clock of the base station lacks at least the predetermined level of synchronous accuracy.

33. The method of claim 32, further comprising:
receiving a disparate synchronization signal; and
tuning the clock of the base station based on the disparate synchronization signal.

34. The method of claim 29, wherein a first subset of base stations from the group transmit respective synchronization signals utilizing resources identified for a coordinated silence upon the channel and a second subset of base stations from the group forgo transmission of respective synchronization signals employing the resources identified for the coordinated silence upon the channel.

35. The method of claim 29, wherein the channel comprises one of a set of subcarriers in an orthogonal frequency division multiple access (OFDMA) system or a frequency band in a frequency division multiple access (FDMA) system.

36. The method of claim 29, further comprising transmitting the first synchronization signal in a particular transmission slot from a set of N transmission slots included in the channel, where N can be an integer.

37. The method of claim 36, further comprising varying the particular transmission slot from the set of N transmission slots utilized to transmit the first synchronization signal over time as a function of a pseudorandom sequence associated with the base station.

38. The method of claim 29, further comprising indicating whether the clock of the base station is one of Global Positioning System (GPS) aligned, self aligned, or aligned from at least one differing base station.

39. A wireless communications apparatus, comprising:
at least one processor configured to:
yield a first synchronization signal based on a clock of a base station, the first synchronization signal comprising first synchronization information having a first level of accuracy;
send the first synchronization signal from the base station over a channel shared by a group of base stations for use in a first synchronization;
yield a second synchronization signal based on the clock of the base station, the second synchronization signal comprising second synchronization information having a second level of accuracy that is higher than the first level of accuracy; and
send the second synchronization signal from the base station over the channel for use in the first synchronization.

40. The wireless communications apparatus of claim 39, wherein the at least one processor is further configured to inhibit sending the second synchronization signal when the clock of the base station lacks at least a predetermined level of synchronous accuracy.

41. The wireless communications apparatus of claim 40, wherein the at least one processor is further configured to:
receive a disparate synchronization signal; and
tune the clock of the base station to the disparate synchronization signal.

42. An apparatus, comprising:
means for generating a first synchronization signal as a function of a clock of a base station, the first synchronization signal comprising first synchronization information having a first level of accuracy;
means for sending the first synchronization signal from the base station over a channel for use in a first synchronization;
means for generating a second synchronization signal as a function of the clock of the base station, the second synchronization signal comprising second synchronization information having a second level of accuracy that is higher than the first level of accuracy; and
means for sending the second synchronization signal from the base station over the channel for use in the first synchronization.

43. The apparatus of claim 42, further comprising means for tuning the clock of the base station based upon a disparate synchronization signal received when the base station lacks at least a predetermined level of synchronous accuracy.

44. A computer program product, comprising:
a non-transitory computer-readable medium comprising:
code for causing at least one computer to yield a first synchronization signal as a function of a clock of a base station, the first synchronization signal comprising first synchronization information having a first level of accuracy;
code for causing at least one computer to transmit the first synchronization signal from the base station over a channel shared by a plurality of base stations for use in a first synchronization;
code for causing at least one computer to yield a second synchronization signal as a function of the clock of the base station, the second synchronization signal comprising second synchronization information having a second level of accuracy that is higher than the first level of accuracy; and code for causing at least one computer to transmit the second synchronization signal from the base station over the channel for use in the first synchronization.

45. The computer program product of claim 44, wherein the non-transitory computer-readable medium further comprises code for causing at least one computer to synchronize the clock of the base station to a disparate synchronization signal received when the base station lacks at least a predetermined level of synchronous accuracy.

46. An apparatus, comprising:
a synchronization signal generation component that yields a first synchronization signal based upon a clock of a transmitting base station, the first synchronization signal comprising first synchronization information having a first level of accuracy;
a transmission component that sends the first synchronization signal from the transmitting base station over a channel shared by a group of base stations for use in a first synchronization;
wherein the synchronization generation component yields a second synchronization signal based on the clock of the base station, the second synchronization signal comprising second synchronization information having a second level of accuracy that is higher than the first level of accuracy; and
wherein the transmission component sends the second synchronization signal from the base station over the channel for use in the first synchronization.

47. The apparatus of claim 46, wherein a first subset of base stations from the group transmit respective synchronization signals utilizing resources identified for a coordinated silence upon the channel and a second subset of base stations from the group forgo transmission of respective synchronization signals employing the resources identified for the coordinated silence upon the channel.

* * * * *